United States Patent
Huang et al.

(10) Patent No.: US 9,768,909 B2
(45) Date of Patent: Sep. 19, 2017

(54) SYSTEMS AND TECHNIQUES FOR ORBITAL ANGULAR MOMENTUM BASED RECONFIGURABLE SWITCHING

(71) Applicants: Hao Huang, Los Angeles, CA (US); Yang Yue, Los Angeles, CA (US); Nisar Ahmed, Los Angeles, CA (US); Moshe J. Willner, Los Angeles, CA (US); Yan Yan, Los Angeles, CA (US); Yongxiong Ren, Los Angeles, CA (US); Moshe Tur, Tel Aviv (IL); Alan E. Willner, Los Angeles, CA (US)

(72) Inventors: Hao Huang, Los Angeles, CA (US); Yang Yue, Los Angeles, CA (US); Nisar Ahmed, Los Angeles, CA (US); Moshe J. Willner, Los Angeles, CA (US); Yan Yan, Los Angeles, CA (US); Yongxiong Ren, Los Angeles, CA (US); Moshe Tur, Tel Aviv (IL); Alan E. Willner, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 53 days.

(21) Appl. No.: 14/663,392

(22) Filed: Mar. 19, 2015

(65) Prior Publication Data
US 2015/0349910 A1    Dec. 3, 2015

Related U.S. Application Data

(60) Provisional application No. 61/955,703, filed on Mar. 19, 2014.

(51) Int. Cl.
*H04J 14/00*    (2006.01)
*H04J 14/04*    (2006.01)

(52) U.S. Cl.
CPC ........... *H04J 14/04* (2013.01); *H04J 14/00* (2013.01)

(58) Field of Classification Search
CPC ................................. H04J 14/04; H04J 14/00
(Continued)

(56) References Cited

U.S. PATENT DOCUMENTS

2015/0333865 A1* 11/2015 Yu ..................... H04B 10/5161
                                                         398/44
2015/0349910 A1* 12/2015 Huang .................... H04J 14/00
                                                         398/44
2016/0212510 A1*  7/2016 Bogoni ................... H04J 14/04

OTHER PUBLICATIONS

Ahmed ["Demonstration of Add/Drop Multiplexer for 100-Gbit/s RZ-QPSK Channels over Spatially Multiplexed Orbital Angular Momentum Modes" IEEE 2012].*

(Continued)

*Primary Examiner* — Oommen Jacob
(74) *Attorney, Agent, or Firm* — Fish & Richardson P.C.

(57) ABSTRACT

In at least one aspect, a device for Orbital Angular Momentum (OAM) based optical communication includes a first spatial light modulator configured to down-convert a first plurality of higher-order OAM modes from a communication signal to a second plurality of higher-order OAM modes and a first Gaussian mode, a second spatial light modulator configured to drop the first Gaussian mode and add a second Gaussian mode to the second plurality of higher-order OAM modes, and a third spatial light modulator configured to up-convert the second plurality of higher-order OAM modes and the second Gaussian mode to a third plurality of higher-order OAM modes for further communications.

13 Claims, 18 Drawing Sheets

(58) Field of Classification Search
USPC .................................................. 398/44, 43
See application file for complete search history.

(56) References Cited

OTHER PUBLICATIONS

Ahmed et al., "Demonstration of add/drop multiplexer for 100-Gbit/s RZ-QPSK channels over spatially multiplexed orbital angular momentum modes," in Proc. IEEE Photonics Conference, 2012, pp. 600-601.

Ahmed et al., "Reconfigurable 2 x 2 orbital angular momentum based optical switching of 50-Gbaud QPSK channels," 2014, Optics Express, 22(1):756-761.

Allen et al., "Orbital angular momentum of light and the transformation of laguerre-gaussian laser modes," Phys. Rev., 1992, 45(11):8185-8189.

Andrews, *Structured Light and Its Applications:An Introduction to Phase-Structured Beams and Nanoscale Optical Forces*, Academic Press, New York, 2008, 8 pages (table of contents only).

Anguita et al., "Turbulence-induced channel crosstalk in an orbital angular momentum-multiplexed free-space optical link.," Appl. Opt., 2008, 47:2414-2429.

Awaji et al., "Demonstration of spatial mode division multiplexing using Laguerre-Gaussian mode beam in telecom-wavelength," Proceedings of the IEEE Photonics Conference (IEEE Photonics Society, 2010, paper WBB2, 2010, pp. 551-552.

Barreiro et al., "Beating the channel capacity limit for linear photonic superdense coding," 2008, Nature Phys, 4:282-286.

Berkhout et al., "Efficient Sorting of Orbital Angular Momentum States of Light," Phys. Rev. Lett., 2010, 105:153601-1-153601-4.

Bernet et al., "Quantitative imaging of complex samples by spiral phase contrast microscopy," Opt. Express, 2006, 14:3792-3805.

Beth, "Mechanical detection and measurement of the angular momentum of Light," Phys. Rev., 1936, 50:115-125.

Boffi et al., "Mode-division multiplexing in fibre-optic communications based on orbital angular momentum," J. Optics, 2013, 15(7):6 pages.

Bozinovic et al., "Terabit-Scale Orbital Angular Momentum Mode Division Multiplexing in Fibers," Science, 2013, 340(6140):1545-1548.

Bozinovic et al., "Control of orbital angular momentum of light with optical fibers," Opt. Lett., 2012, 37:2451-2453.

Bozinovic et al., "Long-range fiber-transmission of photons with orbital angular momentum," in Proceedings of the Conference on Lasers and Electro-Optics paper, CTuB1, CLEO, 2011 Optical Society of America, 2011, 2 pages.

Bozinovic et al., "Orbital Angular Momentum (OAM) based Mode Division Multiplexing (MDM) over a Km-length Fiber," in European Conference and Exhibition on Optical Communication, OSA Technical Digest (online), (Optical Society of America, 2012, paper Th.3.C.6; available at http://dx.doi.org/10.1364/ECEOC.2012.Th.3.C.6., 3 pages.

Bozinovic et al., "Are Orbital Angular Momentum (OAM/Vortex) States of Light Long-Lived in Fibers?," in Frontiers in Optics 2011/Laser Science XXVII, OSA Technical Digest (online), Optical Society of America, 2011, paper LWL3; available at http://dx.doi.org/, 3 pages.

Carpenter et al., "Degenerate mode-group division multiplexing, J. Lightwave Technol.," 2012, 30:3946-3952.

Chen et al., "Demonstration of few-mode compatible optical add/drop multiplexer for mode-division multiplexed superchannel," J. Lightwave Technol, 2013,.31:641-647.

Chen et al., "Reception of Dual-LP11-Mode CO-OFDM Signals through Few-mode Compatible Optical Add/Drop Multiplexer," National Fiber Optic Engineers Conference Mar. 4-8, 2012, paper PDP5B.4, 3 pages.

Cohen-Tannoudji et al., *Photons and Atoms: Introduction to Quantum Electrodynamic*, Wiley, 1989, 14 pages (table of contents only).

Dashti et al., "Observation of Orbital Angular Momentum Transfer between Acoustic and Optical Vortices in Optical Fiber," Phys. Rev. Lett., 2006, 96:043604-1-043604-4.

Dennis et al., "Isolated optical vortex knots," Nature Phys., 2010, 6:118-121.

Dholakia et al., "Shaping the future of manipulation," Nature Photonics, 2011, 5:335-342.

Djordjevic, "Deep-space and near-Earth optical communications by coded orbital angular momentum (OAM) modulation," Opt. Express, 2011, 19:14277-14289.

Doerr et al., "Silicon photonic integrated circuit for coupling to a ring-coremultimode fiber for space-division multiplexing," in Proceedings of the EuropeanConference on Optical Communications paper, Th.13.A.3, ECOC 2011, Geneva, Optical Society of America, 2011, 3 pages.

Earnshaw et al., "Planar Lightwave Circuit Based Reconfigurable Optical Add-Drop Multiplexer Architectures and Reusable Subsystem Module," IEEE J. Sel. Top. Quantum Electron., Mar. 2005, 11(2):313-322.

Elias et al., "Photon orbital angular momentum in astronomy.," Astron. Astrophys., 2008, 492:883-922.

Ertel et al., "Design and Performance of a Reconfigurable Liquid-Crystal-Based Optical Add/Drop Multiplexer," J. Lightwave Technol., 2006, 24(4):1674-1680.

Essiambre et al., "Capacity Trends and Limits of Optical Communication Networks," IEEE, 2012, 100:1035-1055.

Fazal et al., "Demonstration of 2-Tbit/s data link using orthogonal orbital-angular-momentum modes and WDM," in Proceedings of the Frontiers in Optics paper, FTuT1, FiO/LS 2011, San Jose, Optical Society of America, 2011, 2 pages.

Fazal et al., "2 Tbit/s free-space data transmission on two orthogonal orbital-angular-momentum beams each carrying 25 WDM channels," Opt. Lett., 2012, 37(22):4753-4755.

Feuer et al., "ROADM System for Space Division Multiplexing with Spatial Superchannels," in Optical Fiber Communication Conference/ National Fiber Optic Engineers Conference, OSA Technical Digest (online), Optical Society of America, 2013, paper PDP5B.8, 3 pages.

Franke-Arnold et al., "Advances in optical angular momentum," Laser Photon. Rev., 2008, 2:299-313.

Frisken, "Advances in Liquid Crystal on Silicon Wavelength Selective Switching," Optical Fiber Communication Conference and Exposition and The National Fiber Optic Engineers Conference, OSA Technical Digest (CD) (Optical Society of America, 2007), paper OWV4, 2007, 3 pages.

Geng et al., "Four-channel reconfigurable optical add-drop multiplexer based on photonic wire waveguide," Opt. Express, Mar. 2009, 17(7):5502-5516.

Gibson et al., "Free-space information transfer using light beams carrying orbital angular momentum," Opt. Express, Oct. 2004, 12(18):5448-5456.

Gnauck et al., "Spectrally efficient long-haul WDM transmission using 224-Gb/s polarization-multiplexed 16-QAM.," J. Lightwave Technol., 2011, 29:373-377.

Goodman, *Introductions to Fourier Optics*, Roberts, 2005, 14 (table of contents only).

Gregg et al., "Stable Transmission of 12 OAM States in Air-Core Fiber," in Conference on Lasers and Electro-Optics 2013, OSA Technical Digest (online), Optical Society of America, 2013, paper CTu2K.2, 2 pages.

Gröblacher et al., "Experimental quantum cryptography with qutrits," New J. Phys., 2006, 8:8 pages.

Guan et al., "Integrated Optical Orbital Angular Momentum Multiplexing Device using 3-D Waveguides and a Silica PLC," Conference on Lasers and Elector-Optics, Jun. 9-14, 2013, paper CTu1L.4, 2 pages.

Hillerkuss et al., "26 Tbit s21 line-rate super-channel transmission utilizing all-optical fast Fourier transform processing.," Nature Photon., 2011, 5:364-371.

Homa and Bala, "ROADM Architectures and Their Enabling WSS Technology," IEEE Commun. Mag., 2008, 46(7):150-154.

Huang et al., "100 Tbit/s Free-Space Data Link using Orbital Angular Momentum Mode Division Multiplexing Combined with

(56) References Cited

OTHER PUBLICATIONS

Wavelength Division Multiplexing," in Optical Fiber Communication Conference, paper OTh4G.5, 2013, 3 pages.
Huang et al., "Liquid-crystal-on-silicon-based optical add/drop multiplexer for orbital-angularmomentum-multiplexed optical links," Optics Letters, Dec. 2013, 38(23):5142-5145.
Huang et al., "Orbital-Angular-Momentum-Based Reconfigurable and 'Lossless' Optical Add/Drop Multiplexing of Multiple 100-Gbit/s Channels," Optical Fiber Communication Conference, Mar. 17-21, 2013, Paper OTh4G.4, 3 pages.
Jackson, *Classical Electrodynamics*, Wiley, 1962, 9 pages (table of contents only).
Kogelnik et al., "Laser beams and resonators.," Appl. Opt., 1996, 5:1550-1567.
Leach et al., "Quantum correlations in optical angle-orbital angular momentum variables," Science, 2010, 329:662-665.
Liu et al., "1.12-Tb/s 32-QAM-OFDM superchannel with 8.6-b/s/Hz intrachannel spectral efficiency and space-division multiplexed transmission with 60-b/s/Hz aggregate spectral efficiency.," Opt. Express, 2011, 19:B958-B964.
MacDonald et al., "Creation and manipulation of three-dimensional optically trapped structures," Science, 2002, 296:1101-1103.
Mair et al., "A. Entanglement of the orbital angular momentum states of photons.," Nature, 2001, 412:313-316.
Mandel and Wolf, *Optical Coherence and Quantum Optics*, Cambridge University Press, 1995, 17 pages (table of contents only).
Marcuse, "Microdeformation losses of single-mode fibers,"Appl Opt., 1984. 23:1082-1091.
Marrucci et al., "Optical spin-to-orbital angular momentum conversion in inhomogeneous anisotropic media," Phys. Rev. Lett., 2006, 96:163905-1-163905-4.
Martelli et al., "Free-space optical transmission with orbital angular momentum division multiplexing," Electron. Lett., Aug. 18, 2011, 47(17):972-973.
McGloin et al., "Transfer of orbital angular momentum from a stressed fiber-optic waveguide to a light beam," Appl. Opt., 1998, 37:469-472.
McMorran et al., "Electron vortex beams with high quanta of orbital angularmomentum," Science, 2011, 331:192-195.
Miller, "Reconfigurable add-drop multiplexer for spatial modes," Opt. Express, Aug. 26, 2013, 21(17): 20220-20229.
Molina-Terriza et al., "Twisted photons.," Nature Phys., 2007, 3:305-310.
Mukherjee, "WDM optical communication networks: Progress and challenges," IEEE J. Sel. Areas Commun., 2000, 18:1810-1824.
Nagali et al., "Optimal quantum cloning of orbital angular momentum photon qubits through Hong-Ou-Mandel coalescence.," Nature Photon., 2009, 3:720-723.
Padgett and Bowman., "Tweezers with a twist. Nature Photon.," 2011, 5:343-348.
Paterson et al., "Controlled rotation of optically trapped microscopic particles," Science, 2001, 292:912-914.
Paterson, "Atmospheric turbulence and orbital angular momentum of single photons for optical communication.," Phys. Rev. Lett., 2005, 94:153901-1-153901-4.
Poynting, "The wave motion of a revolving shaft, and a suggestion as to the angular momentum in a beam of circularly polarised light," Proc. R. Soc. Lond., 1909, 82:560-567.
Ramachandran et al., "Measurement of Multipath Interference in the Coherent Crosstalk Regime," IEEE Photon. Technol. Lett., 2003, 15:1171-1173.
Ramachandran et al., "Generation and propagation of radially polarized beams in optical fibers.," Opt. Lett., 2009, 34:2525-2527.
Ramachandran et al., "Evolution and Systems Impact of Coherent Distributed Multipath Interference," IEEE Photon. Technol. Lett., 2005, 17:238-240.
Richardson et al, "Space-division multiplexing in optical fibres," Nat. Photonics, 2013, 7(5):354-362.
Richardson, "Filling the Light Pipe," Science, 2010, 330:327-328.
Richter et al., "Transmission of single-channel 16-QAM data signals at terabaud symbol rates," J. Lightwave Technol., 2012, 30:504-511.
Ryf et al., "Mode-division multiplexing over 96 km of few-mode fiber using coherent 6 x 6 MIMO processing.," J. Lightwave Technol., 2012, 30:521-531.
Ryf et al., "Space-division multiplexed transmission over few-modeand coupled-core fiber based on coherent MIMO digital signal processing," Proc. SPIE 8284, 2012, 828402-1-828402-13.
Sakaguchi et al., "Space Division Multiplexed Transmission of 109-Tb/s Data Signals Using Homogeneous Seven-Core Fiber," J. Lightwave Technol., 2012, 30:658-665.
Sano et al., "Ultra-high capacity WDM transmission using spectrally-efficient PDM 16-QAM modulation and C- and extended L-band wideband optical amplification.," J. Lightwave Technol., 2011, 29:578-586.
Sasaki and McNulty, "Proposal for generating brilliant X-ray beams carrying orbital angular momentum," Phys. Rev. Lett., 2008, 100:124801-1-124801-4.
Schmidt-Langhorst et al., "Generation and Coherent Time-Division Demultiplexing of up to 5.1 Tb/s Single-Channel 8-PSK and 16-QAM Signals," Proceedings Optical Fiber Communications, Mar. 22-26, 2009, PDPC6. 3 pages.
Shapiro et al., "Ultimate channel capacity of free-space optical communications [Invited]," J. Opt. Netw, Aug. 2005, 4(8):501-516.
Su et al., "Demonstration of free space coherent optical communication using integrated silicon photonic orbital angular momentum devices", Opt. Express, Apr. 2012, 20(9):9396-9402.
Sunnerud et al., "A Comparison Between Different PMD Compensation Techniques," J. Lightwave Technol., 2002, 20:368-378.
Tamburini et al., "Encoding many channels on the same frequency through radio vorticity: first experimental test," New J. Phys., 2012, 14:17 pages.
Thide et al., "Utilization of photon orbital angular momentum in the lowfrequency radio domain," Phys. Rev. Lett., 2007, 99:4 pages.
Tomlinson, "Evolution of passive optical component technologies for fiber-optic communication systems," J. Lightwave Technol., 2008, 26(9):1046-1063.
Turnbull et al., "The generation of free-space Laguerre-Gaussian modes at millimetre-wave frequencies by use of a spiral phaseplate." Opt. Commun., 1996, 127:183-188.
Uchida and Tonomura, "Generation of electron beams carrying orbital angular momentum," Nature, 2010, 464:737-739.
Walborn et al., "Multimode Hong-Ou-Mandel Interference.," Phys. Rev. Lett., 2003, 90:143601-1-143601-4.
Wang et al., "25.6-bit/s/Hz spectral efficiency using 16-QAM signals over pol-muxed multiple orbital-angular-momentum modes," in Proceedings of the IEEE Photonics Conference paper WW2, PHO 2011, Denver, EEE Photonics Society, 2011, 2 pages.
Wang et al., "Experimental demonstration of 100-Gbit/s DQPSK data exchange between orbital-angular-momentum modes," in Proceedings of the Optical Fiber Communication Conference paper, OW11.5, OFC/NFOEC 2012, Los Angeles, Optical Society of America, 2012, 3 pages.
Wang et al., "Demonstration of 12.8-bit/s/Hz Spectral Efficiency using 16-QAM Signals over Multiple Orbital-Angular-Momentum Modes," European Conference and Exposition on Optical Communications, Sep. 18-22, 2011, paper We.10.P1.76, 3 pages.
Wang et al., "Terabit free-space data transmission employing orbital angular momentum multiplexing," Nature Photonics, 2012, 6:488-496.
Willner et al., "Reconfigurable Orbital-Angular-Momentum Manipulation and Switching of Polarization-Multiplexed 100-Gbit/s QPSK Data Channels," Optics Letters, 2013, 38(24):2 pages.
Winzer et al., "Spectrally Efficient Long-Haul Optical Networking Using 112-Gb/s Polarization-Multiplexed 16-QAM," JLT, Feb. 15, 2010, 28(4):547-556.
Wong et al., "Excitation of Orbital Angular Momentum Resonances in Helically Twisted Photonic Crystal Fiber," Science, 2012, 337:446-449.
Wong et al., Excitation of Orbital Angular Momentum Resonances in Helically Twisted Photonic Crystal Fiber, Science, 2012, 337:446-449 (supplementary materials—5 total pages).

(56) References Cited

OTHER PUBLICATIONS

Yan et al., "Multicasting in a Spatial Division Multiplexing System Based on Optical Orbital Angular Momentum," Opt. Lett., 2013, 38(19):930-3933.

Yao and Padgett, "Orbital angular momentum: origins, behavior and applications," Adv. Opt. Photon. Jun. 2011, 3(2):161-204.

Yue et al., "Reconfigurable Orbital-Angular-Momentum-Based Switching among Multiple 100-Gbit/s Data Channels," OSA Technical Digest, 2013, 3 pages.

Yue et al., "1.6-Tbit/s Muxing, Transmission and Demuxing through 1.1-km of Vortex Fiber Carrying 2 OAM Beams Each with 10 Wavelength Channels," in Optical Fiber Communication Conference, paper OTh4G.2, 2013, 3 pages.

Zhao et al., "Aberration corrections for free-space optical communications in atmosphere turbulence using orbital angular momentum states," Opt. Express, 2012, 20:452-461.

Zhou et al., "64-Tb/s, 8 b/s/Hz, PDM-36QAM transmission over 320 km using both pre- and post-transmission digital signal processing.," J. Lightwave Technol., 2011, 29:571-577.

Zhu et al., "Space-, wavelength-, polarization-division multiplexed transmission of 56-Tb/s over a 76.8-km seven-core fiber," in Optical Fiber Communication Conference, 2011, 3 pages.

\* cited by examiner

SYSTEMS AND TECHNIQUES FOR ORBITAL ANGULAR MOMENTUM BASED RECONFIGURABLE SWITCHING

CROSS-REFERENCE TO RELATED APPLICATIONS

This application claims priority to U.S. patent application Ser. No. 61/955,703, filed on Mar. 19, 2014, which is incorporated herein by reference in its entirety.

STATEMENT AS TO FEDERALLY SPONSORED RESEARCH

This invention was made with Government support under Information in a Photon (InPho) program, contract number W911NF-12-1-0312, awarded by DARPA (Defense Advanced Research Projects Agency). The Government has certain rights in the invention.

BACKGROUND

This disclosure relates to optical communication systems.

The commercially available optical communication systems are wavelength-division multiplexing (WDM) systems, which use each wavelength to carry different data channels. WDM-based switching have been invented and widely used. Current demonstrated Orbital Angular Momentum (OAM) based optical transmission systems have static point-to-point links, with no reconfigurability.

SUMMARY

In an OAM multiplexed communication system, each OAM mode carries an independent data channel. The subject matter of this application can allow one to readily drop a selected data channels from multiple multiplexed data channels and replace it with a different one. It also allows one to exchange the data carried on two different CAM beams. The invention can provide reconfigurablity and can enhance the usability of the OAM multiplexing system.

Commercially available systems are typically wavelength-division multiplexing (WDM) systems, which use each wavelength to carry different data channels. WDM-based switching has been widely used. Current demonstrated OAM-based optical transmission systems have static point-to-point links, with no reconfigurability. In contrast, the subject matter described herein provides a different approach to use of OAM, which is a new dimension different than wavelength to multiplex as many data channels as possible. The subject matter described herein is based on OAM and allows switching among different OAM modes, which is completely different than a wavelength switch.

OAM multiplexing can increase data transmission capacity because multiple independent data channels can be combined into a single link. Different OAM modes with the same wavelength can be used and still be orthogonal to each other. Therefore, the same wavelength can be reused to carry more data channels, thereby increases the spectral efficiency. Moreover, given the OAM multiplexed communication system, switching techniques can be used to help build a smart and reconfigurable network with higher throughput and less latency.

In some cases, optical communication using OAM multiplexing can have OAM modes that experience distortions when passing through turbulent air. Such distortions may result in crosstalk (i.e., interference) among different data channels. However, such distortion can be compensated for using various methods, such as adaptive optics or algorithm to mitigate the potential for crosstalk.

Commercial applications of the subject matter described herein can include: (1) in a datacenter, where very high capacity and short reach wireless optical data link might be required, and a regular WDM system might not be able to satisfy the fast growth of the data traffic; (2) to build very fast data links between two tall buildings, in the case that the cable-based connection is not available, or not fast enough to exchange the information; and (3) deep space communication (e.g., between satellites). Moreover, in some cases, the systems and techniques described herein can be extended from optical systems to radio frequency (RF) systems.

An aspect of the subject matter described in this specification can be embodied in a device for Orbital Angular Momentum (OAM) based optical communication that includes a first spatial light modulator configured to down-convert a first plurality of higher-order OAM modes from a communication signal to a second plurality of higher-order OAM modes and a first Gaussian mode, a second spatial light modulator configured to drop the first Gaussian mode and add a second Gaussian mode to the second plurality of higher-order OAM modes, where the first Gaussian mode is different from the second Gaussian mode, and a third spatial light modulator configured to up-convert the second plurality of higher-order OAM modes and the second Gaussian mode to a third plurality of higher-order OAM modes for further communications. Other embodiments of this aspect include corresponding systems, apparatus, methods, and computer program products.

Implementations can include one or more of the following features. Some implementations include a fourth spatial light modulator configured to down-convert a fourth plurality of higher-order OAM modes from a communication signal to a fifth plurality of higher-order OAM modes and a third Gaussian mode. In some implementations, the third spatial light modulator includes two parts, an inner part configured to up-convert the at least one second Gaussian mode, and an outer part, surrounding the inner part, configured to up-convert the second plurality of OAM modes.

In some implementations, the second spatial light modulator includes an inner part, and an outer part, surrounding the inner part; the inner part reflects the at least first Gaussian mode, and the outer part reflects the modes of the second plurality of OAM modes other than the first Gaussian mode. In some implementations, the third Gaussian mode is the second Gaussian mode. In some implementations, the second spatial light modulator is configured to drop the third Gaussian mode, and add the first Gaussian mode to the fifth plurality of higher-order OAM modes.

In some implementations, the fifth spatial light modulator includes two parts, an inner part configured to up-convert the first Gaussian mode, and an outer part, surrounding the inner part, configured to up-convert the fifth plurality of higher-order OAM modes. Some implementations include a fifth spatial light modulator configured to up-convert the fifth plurality of higher-order OAM modes and the first Gaussian mode to a sixth plurality of higher-order OAM modes for further communication. In some implementations, the inner part of the fifth spatial light modulator is configured such that the angle of reflection of the first Gaussian mode is greater than the angle of incidence of the first Gaussian mode. In some implementations, the outer part of the fifth spatial light modulator is configured such that the angle of reflection of the second plurality of higher-order OAM modes is less than the angle of incidence of the second plurality of higher-order OAM modes.

According to another aspect, the subject matter described in this specification can be embodied in an Orbital Angular Momentum (OAM) based optical communication system that includes a reconfigurable add/drop multiplexer configured and arranged to process a plurality of multiplexed OAM mode channels to selectively extract a first OAM mode channel of the plurality of multiplexed OAM mode channels and also insert a second OAM mode channel into the plurality of multiplexed OAM mode channels to replace the first OAM mode channel. The OAM based optical communication system also includes a switch that has two or more input ports and two or more output ports. Each of the ports has at least two multiplexed OAM modes, and the switch is configured and arranged to exchange data among the two or more input ports and the two or more output ports using a selection of two or more OAM modes.

Implementations can include one or more of the following features. Some implementations are configured and arranged to change both an OAM mode and a polarization of the channel. In some implementations, the switch is configured and arranged to change both the OAM mode and the polarization of the channel. The switch includes a first spatial light modulator having different regions, a first of the different regions configured to redirect a Gaussian beam out of alignment with a first OAM beam and also convert the Gaussian beam into a second OAM beam different from the first OAM beam, and a second of the different regions configured to redirect the first OAM beam and shift an OAM charge of the first OAM beam. The switch also includes a second spatial light modulator configured to generate the first OAM beam and the Gaussian beam from a first polarization optical signal, a polarization beam splitter configured to split a received optical signal into the first polarization optical signal and a second polarization optical signal, a half wave plate configured to modify the second polarization optical signal, and a mirror configured to redirect the modified second polarization optical signal to the first spatial light modulator.

Some implementations are configured and arranged to exchange data between any two of multiple multiplexed OAM beams. Some implementations include a first programmable spatial light modulator configured to receive and convert the multiple multiplexed OAM beams, a selective exchange spatial light modulator that includes different regions having different patterns that effect selective manipulation of OAM modes received from the first programmable spatial light modulator, and a second programmable spatial light modulator configured to receive and covert the OAM modes manipulated at the selective exchange spatial light modulator.

Some implementations include a first programmable spatial light modulator configured and arranged to selectively down-convert the first OAM mode channel to a Guassian mode that is spatially separated from remaining ones of the plurality of multiplexed OAM mode channels. The implementation also includes a grating having an inner part and an outer part that surrounds the inner part. The inner part corresponds to the spatially separated Guassian mode, and the outer part corresponds to the remaining ones of the plurality of multiplexed OAM mode channels. The implementation also includes a second programmable spatial light modulator configured and arranged to selectively up-convert any Guassian mode channel, which has been added to the plurality of multiplexed OAM mode channels, to the first OAM mode of the first OAM mode channel.

In some implementations, each of the first programmable spatial light modulator and the second programmable spatial light modulator include a liquid crystal on silicon-based spatial light modulator. In some implementations, the switch includes a down conversion stage configured to transform a selected OAM mode on each of the input ports to a Gaussian mode, a mode-dependent beam-steering element configured to redirect the Gaussian modes from the input ports to swap their alignments with respect to remaining OAM modes from the input ports, and an up conversion stage configured to transform the redirected Gaussian modes to selected OAM modes for provision to the output ports. In some implementations, the switch includes cascaded 2×2 optical switches.

Various embodiments of the subject matter described in this specification can be implemented to realize one or more of the following advantages. Use of reconfigurable switching of spatial modes based on orbital angular momentum (OAM) modes can add another degree of freedom to existing wavelength division multiplexed (WDM) networking communications. The reconfigurable switching based on OAM modes can have potential use in future high-capacity inhomogeneous optical networking systems. In addition, the OAM multiplexing described herein (for multiplexing data channels) can be combined with traditional WDM and also polarization-division multiplexing (PDM). OAM multiplexing can be used to greatly increase the data transmission capacity of an optical communication link in networking communications that go beyond static point-to-point data communications links.

A high performance optical communication network can be provided using OAM multiplexing and reconfigurable functions (e.g., channel switching and add/drop of channels) for network processing of OAM beams. Networking functions can be implemented on the top of static data transmission links using OAM multiplexing. For example, selective OAM mode switching, 2×2 optical switching, and polarization switching can be implemented based on the unique property of OAM modes. The OAM mode and polarization switching can allow selective swapping of the data streams that are carried on different OAM modes, and with different polarizations. The 2×2 switch is a basic unit, which can be cascaded to form a multiple input-multiple output optical switch. These functions can add reconfigurability to OAM multiplexed communications systems, and can thus be very useful in future high-capacity inhomogeneous optical networking systems.

Details of one or more implementations are set forth in the accompanying drawings and the description below. Other features, objects, and advantages may be apparent from the description and drawings, and from the claims.

DETAILED DESCRIPTION

Angular momentum of a photon can be divided into spin angular momentum (SAM) and orbital angular momentum (OAM) in paraxial beams. SAM is associated with photon spin and manifested as circular polarization. OAM is linked to the spatial distribution of intensity and phase of a paraxial beam. Helically phased beams with an azimuthal phase term $exp(il\theta)$ have and OAM of $l\hbar$. Here l is the topological charge, $\hbar$ is reduced Plank's constant, and $\theta$ is azimuthal angle. In this application, OAM modes with l>0 and l<0 are referred to as higher-order modes. The OAM mode with l=0, has a Gaussian intensity profile. In this application, the OAM mode with l=0 is referred to as a Gaussian mode or Gaussian beam. OAM modes with different topological charge are orthogonal.

OAM has recently seen applications in free-space information transfer and communication. In contrast to SAM, which has only two possible values, of $\pm\hbar$, the topological charge can take many values and therefore, in principle, provide a large range of possibly achievable OAM modes. OAM beams, composed of multiple OAM modes, have the potential to tremendously increase the capacity of communication systems. While wavelength-division multiplexing (WDM) and polarization-division multiplexing (PDM) schemes are quite mature, multiplexing independent data channels using spatial degree of freedom, namely spatial-division multiplexing (SDM), has recently gained substantial interest. Two SDM techniques are under rigorous investigation: 1) multiplexing data channels using higher-order OAM modes, and 2) the use of separate data streams transmitted over different cores in a multicore fiber. Increased capacity is achieved by exploiting the inherent orthogonality among WDM, PDM, and SDM, which permits multidimensional multiplexing of data channels transmitted over the same link. In recent years, multiplexing of data channels using orbital angular momentum (OAM) carrying light beams has emerged as a potential SDM approach to multiplex many spatially collocated optical data carrying beams. Since OAM beams with different l values are orthogonal to each other, it is possible to efficiently multiplex and demultiplex data channels using OAM beams.

Figure 1A:
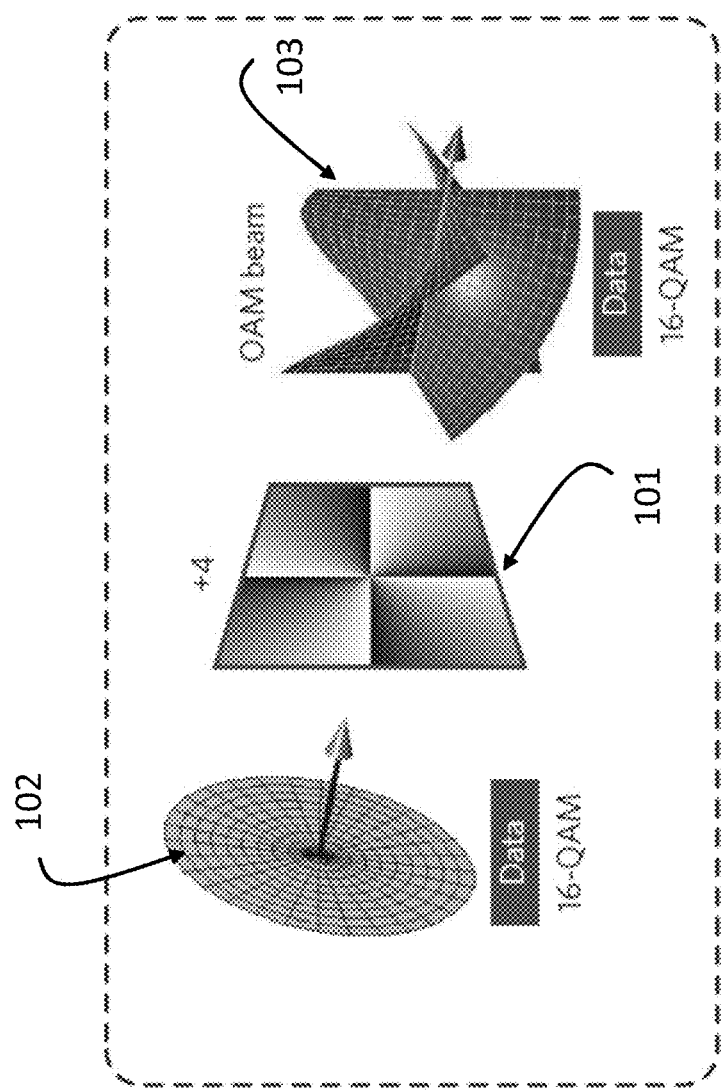
FIG. 1A illustrates the schematic representation of generation of an OAM beam with helical phase front from a beam with planer phase front.
Figure 1B:
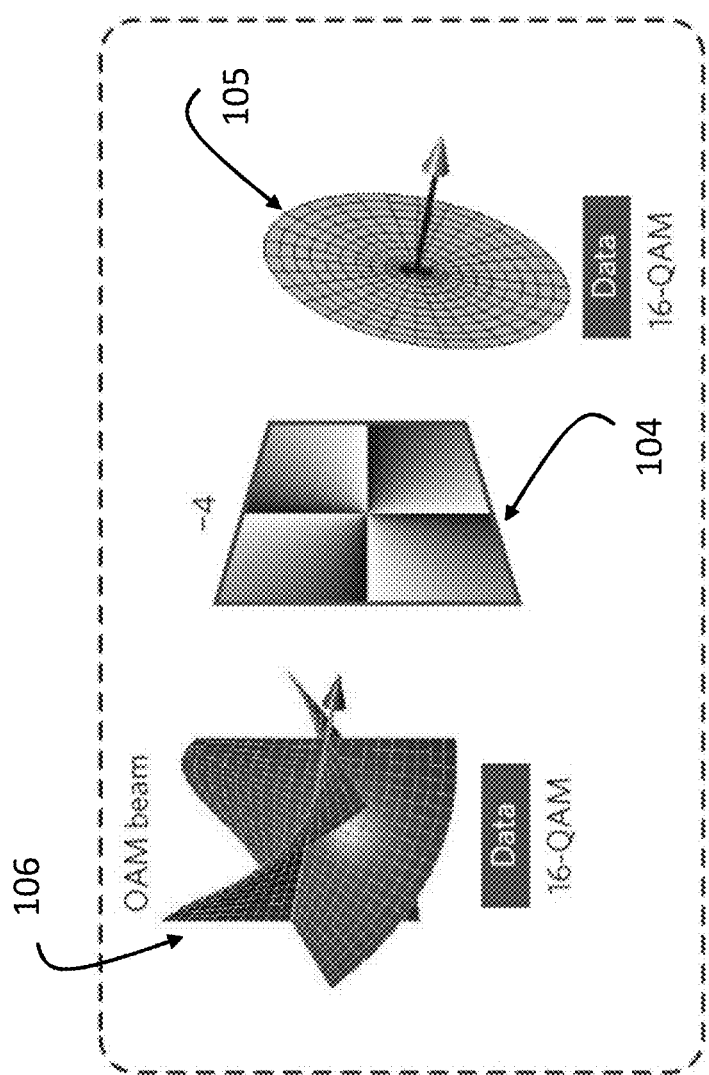
FIG. 1B illustrates the schematic representation of generation of a beam with planer phase front from an OAM beam with helical phase front.

FIGS. 1A and 1B present a schematic representation of the generation and back-conversion of an information-carrying OAM beam, where a light beam with OAM serves as a carrier of information, which emerges in a multilevel amplitude/phase modulation format (for example, 16-QAM). The phase and amplitude of a light beam (for example an OAM beam) can be modified using a Spatial Light Modulator (SLM). In this application, SLM has been broadly used to include Spiral phase mask, Spiral phase plate, Diffraction grating, Deformable mirror array or any other optical element that can modify the spatial amplitude and phase distribution of light that impinges on it. SLM can be both reflective and transmissive. In FIG. 1A, the SLM is a spiral phase mask 101 (with l=+4) that converts a planar phase front 102 into a helical one 103, resulting in the generation of an information-carrying OAM beam from an information-carrying Gaussian beam. Conversely, in FIG. 1B, an inverse spiral phase mask 104 (with l=−4) recovers an information-carrying beam with a planar phase front 105 from an information-carrying OAM beam with a helical phase front 106. Owing to their inherent orthogonality, OAM beams can be used to enable a variety of optical communication applications, such as multiplexing/demultiplexing of information-carrying OAM beams to achieve an increase in capacity and spectral efficiency, and data exchange between OAM beams for flexible data processing.

Figure 1C:
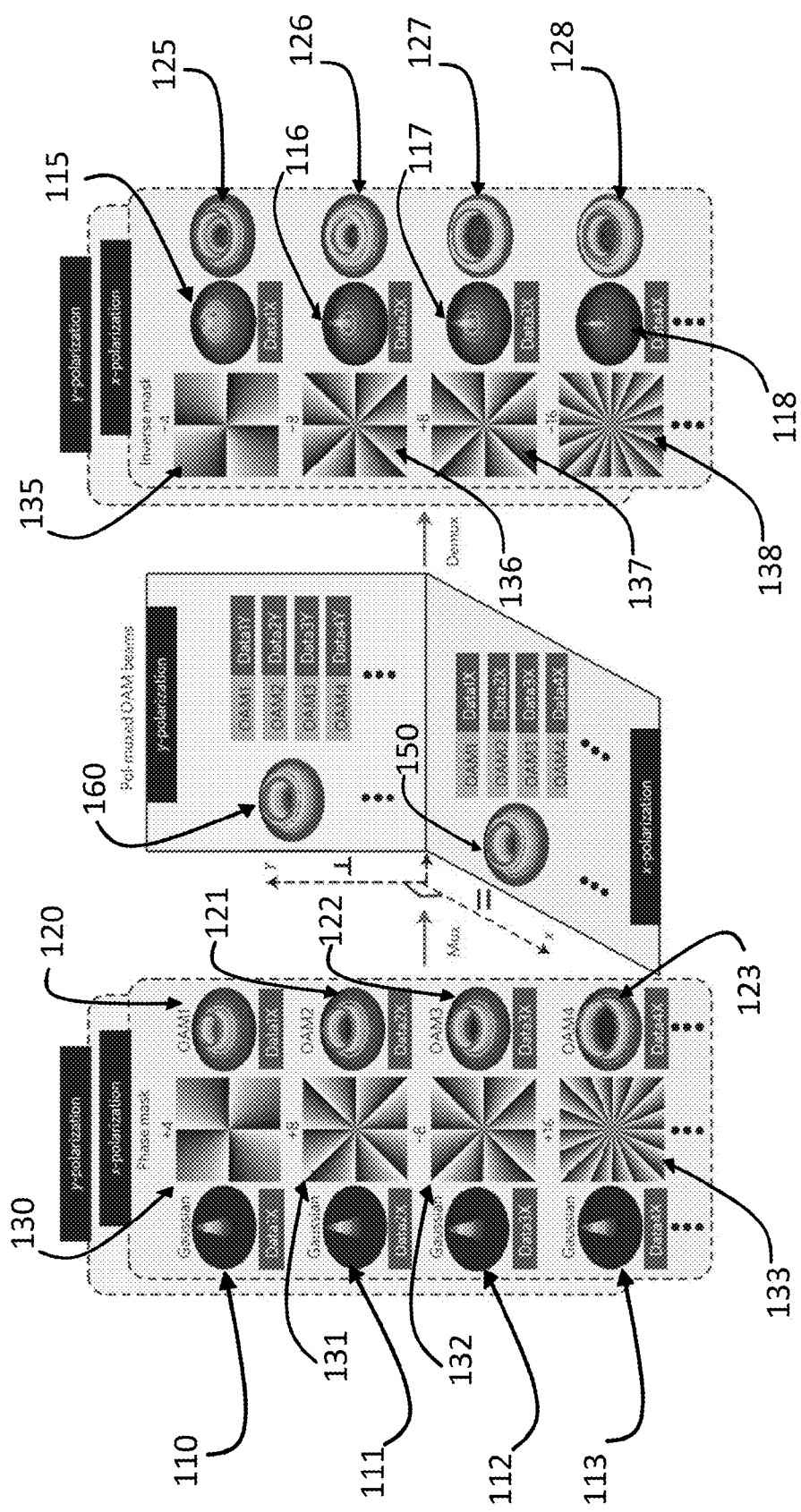
FIG. 1C illustrates a conceptual diagram of multiplexing/demultiplexing of OAM beams.

A conceptual diagram of the multiplexing/demultiplexing of OAM beams is presented in FIG. 1C. In optical communications, OAM can be considered as an additional degree of freedom, where the multiplexing of information-carrying OAM beams provides yet another dimension in the ever-continuing effort to increase the capacity and spectral efficiency of communication links. The capacity and spectral efficiency can be increased further by making use of polarization multiplexing. For example, as shown in FIG. 1C, four Gaussian beams 110, 111, 112 and 113 carrying four independent channels of data information (Data1X, Data2X, Data3X, Data4X) are transformed into four OAM beams: OAM1(Data1X) 120, OAM2(Data2X) 121, OAM3 (Data3X) 122, and OAM4(Data4X) 123, for multiplexing, by adding spiral phase masks with topological charges l=4 130, l=−8 131, l=8 132, and l=16 133. The multiplexing of higher-order OAM modes, OAM1(Data1X) 120, OAM2 (Data2X) 121, OAM3(Data3X) 122, and OAM4(Data4X) 123, can be considered as a form of spatial multiplexing of beams which results in a multiplexed OAM beam 150. By introducing polarization multiplexing, four more independent channels of data information (Data1Y, Data2Y, Data3Y, Data4Y) can be carried by four OAM beams polarized in the y-direction: OAM1(Data1Y), OAM2(Data2Y), OAM3 (Data3Y), and OAM4(Data4Y) (not shown). The multiplexing of OAM1(Data1Y), OAM2(Data2Y), OAM3(Data3Y), and OAM4(Data4Y), can be considered as a form of spatial multiplexing of beams which results in a multiplexed OAM beam 1160.

Four pol-muxed OAM beams can allow for the multiplexing of eight independent channels of data information on the same wavelength which provides an eightfold improvement in capacity and spectral efficiency. It is expected that multiplexing OAM beams, in combination with polarization multiplexing, will increase the capacity and spectral efficiency by a factor of 2 N, where N is the number of OAM beams. To demultiplex an OAM beam with topological charge l of interest, an inverse spiral phase mask with a specified charge −l is used to remove the azimuthal phase term exp(ilθ) of the OAM beam, which is therefore converted back to a beam with a planar phase front (Gaussian beam). This beam has a bright high-intensity spot at the center, which is separable from other OAM beams with updated charges and 'doughnut' shapes by means of spatial filtering. For example by applying the inverse spiral mask with topological charge l=−4 135, l=−8 136, l=8 137, and l=−16 138, on the multiplexed OAM beam 150, Gaussian beams 115, 116, 117, 118 and the corresponding higher-order OAM modes 125, 126, 127, and 128 are obtained. The Gaussian beams can be separated from the corresponding higher-order OAM modes by spatial filtering.

Figure 2A:
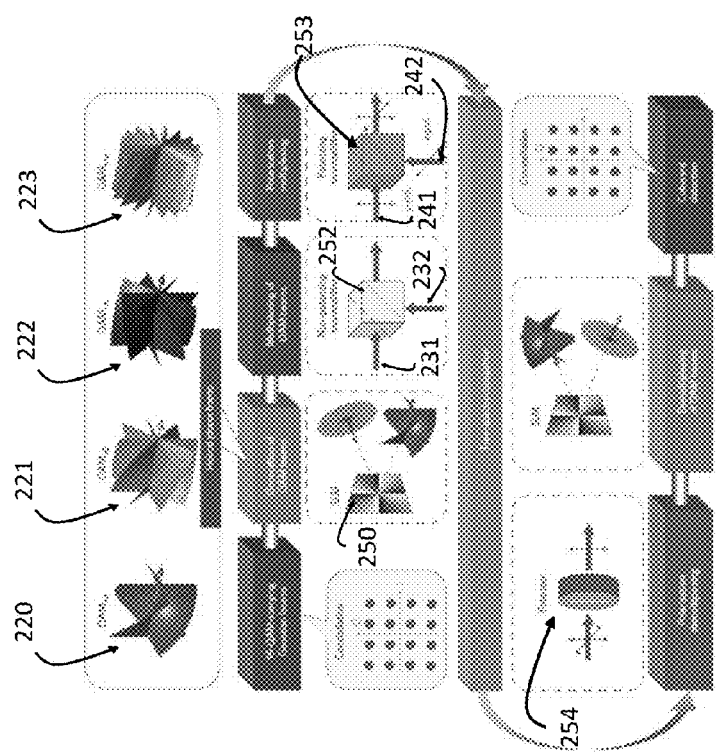
FIG. 2A illustrates the block diagram of experimental set-up showing the multiplexing and demultiplexing of information carrying OAM beams.

FIG. 2A presents a block diagram of the experimental set-up showing the multiplexing and demultiplexing of information carrying OAM beams. Four Gaussian beams (1550.12 nm) with planar phase fronts, each carrying a 16-QAM signal, are converted into four OAM beams $OAM_{+4}$ 220, $OAM_{+8}$ 221, $OAM_{−8}$ 222 and $OAM_{−16}$223 with helical phase fronts. As discussed earlier, the generation of OAM beams is realized by adding a spiral phase mask 250 in the optical path of a gaussian beam, resulting in an OAM beam. The SLMs can have dimensions of 7.68×7.68 mm, 512×512 pixels, a wavelength range of 1505 nm-1650 nm, and a fast response (<20 ms), providing phase modulation for linearly polarized light with a high efficiency of 90-95%.

Multiplexing of two OAM beams 231 and 232, each OAM beam having the same polarization, can be achieved by a non-polarizing beam splitter 252. Multiplexing of two OAM beams 241 and 242, each OAM beam having orthogonal polarization (241 has y-polarization and 242 has x polarization), can be achieved by a polarizing beam splitter 253, resulting in a polarization multiplexed OAM beam. The OAM beams propagate in free space over a meter-length scale. For demultiplexing, the pol-muxed OAM beams are first polarization-demultiplexed by a polarizer 254. A second SLM, loaded with a specific spiral phase mask, is then used to demultiplex the OAM beam back to a beam with a planar phase front for coherent detection.

Figure 2B:
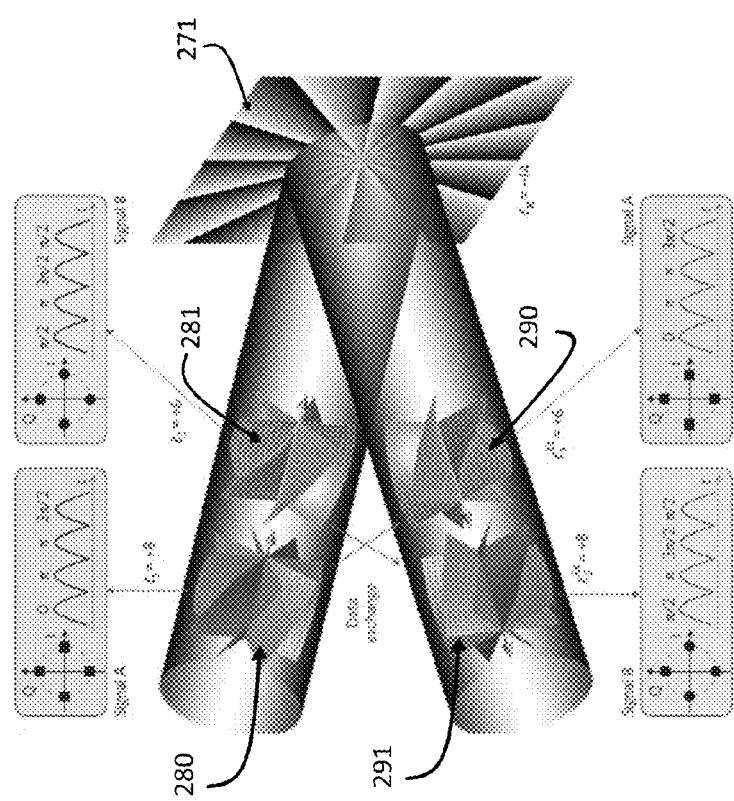
FIG. 2B illustrates conceptually the exchange of data between OAM beams.

FIG. 2B illustrates conceptually the data exchange between OAM beams. Two superposed OAM beams ($OAM_{l_1}$280, $OAM_{l_2}$281), each carrying different data information (signal A, signal B), shine on a reflective-type SLM 271 loaded with a spiral phase mask with a charge of $l_R=−(l_1+l_2)$. After reflecting off the SLM, this phase mask adds an azimuthal phase term $exp(il_R\theta)$ to the two OAM beams and reflects them. As a result, $OAM_{l_1}$ 280, and $OAM_{l_2}$281 are converted into $OAM_{l_2}$ 290, and $OAM_{l_1}$ 291 respectively. As a result, data exchange between two OAM beams is implemented. For another input of two OAM beams with varied charges, reconfigurable data exchange is available by updating the phase mask loaded into the reflective-type SLM.

Figure 3:
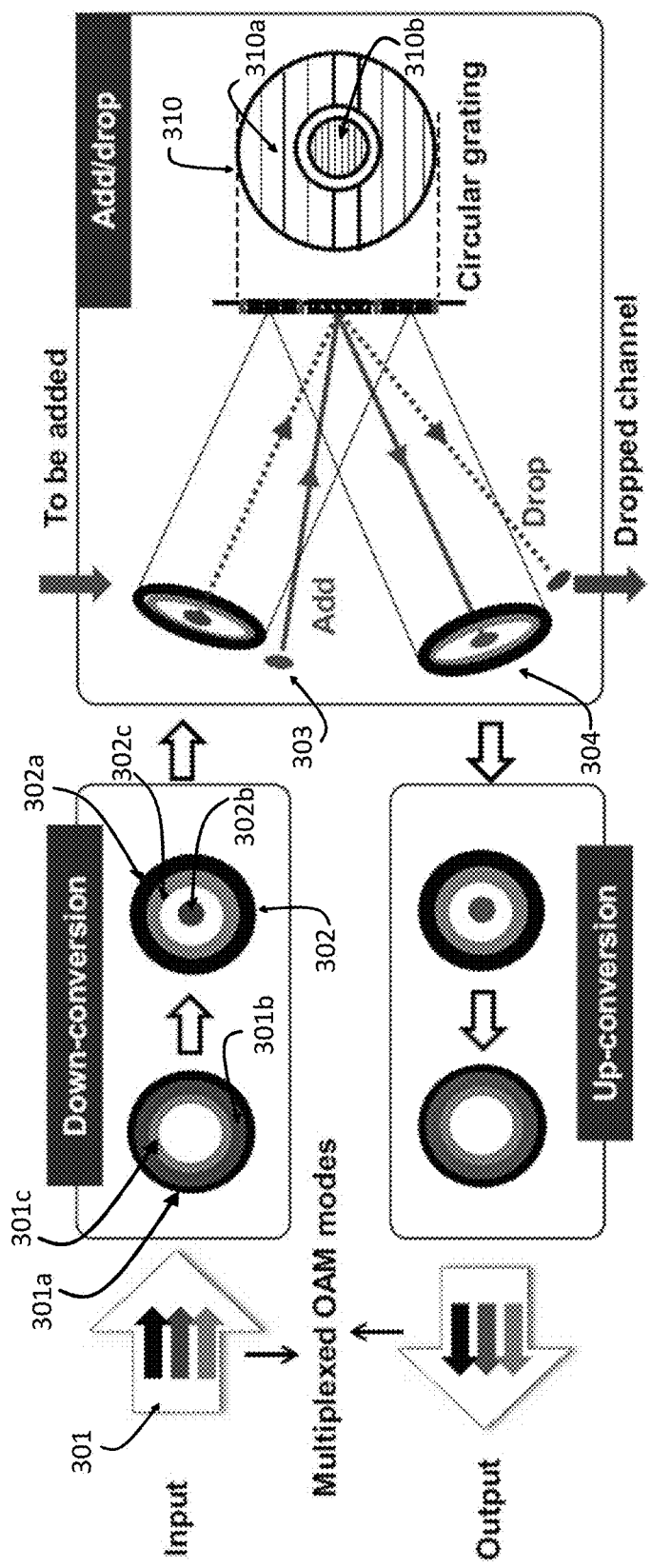
FIG. 3 illustrates the concept and principle of OAM mode add/drop multiplexing.

In FIG. 3, the concept and principle of OAM mode add/drop multiplexing is illustrated. An input beam 301 is down-converted by a programmable SLM (not shown). Three higher-order OAM modes 301a, 301b, and 301c are multiplexed to obtain the input beam 301. Three higher-order OAM modes are chosen only for the sake of illustration. In principle, the input beam 301 could be a single higher-order OAM mode or multiple OAM modes can be multiplexed to obtain the input beam 301. The input beam 301 is down-converted by the programmable SLM to a beam 302. The programmable SLM can be programmed to down-convert a selected higher-order P OAM mode to a Gaussian mode, so that the Gaussian mode is spatially separated from the other down-converted higher-order modes. In FIG. 3 301b is down-converted to a Gaussian beam 302b. The higher-order OAM modes 301a and 301c are down-converted to higher-order modes 302a and 302c. After the down-conversion, the beam 302 impinges on a second SLM. In FIG. 3 the second SLM is a specially designed circular grating 310 that redirects the down-converted Gaussian beam 302b apart from the higher-order OAM modes. The circular grating 310 has two parts: an inner part 310b and an outer part 310a that surrounds the inner part. The Gaussian beam 302b impinges the inner part of the circular grating 310b, and the higher-order OAM modes (302a and 302c) impinge the outer part of the circular grating 310a. Another Gaussian beam 303 carrying a new data stream impinges on the inner part of the circular grating 310b and is reflected in the same direction as the higher-order OAM modes 301a and 310c. As a result, the reflected Gaussian beam 303 and the reflected OAM modes 302a and 302c are multiplexed to produce an outgoing beam 304. Then the modes of the outgoing beam 304 are up-converted back to modes with the topological charge of the modes of 301 by a third spatial light modulator (not shown).

Figure 4:
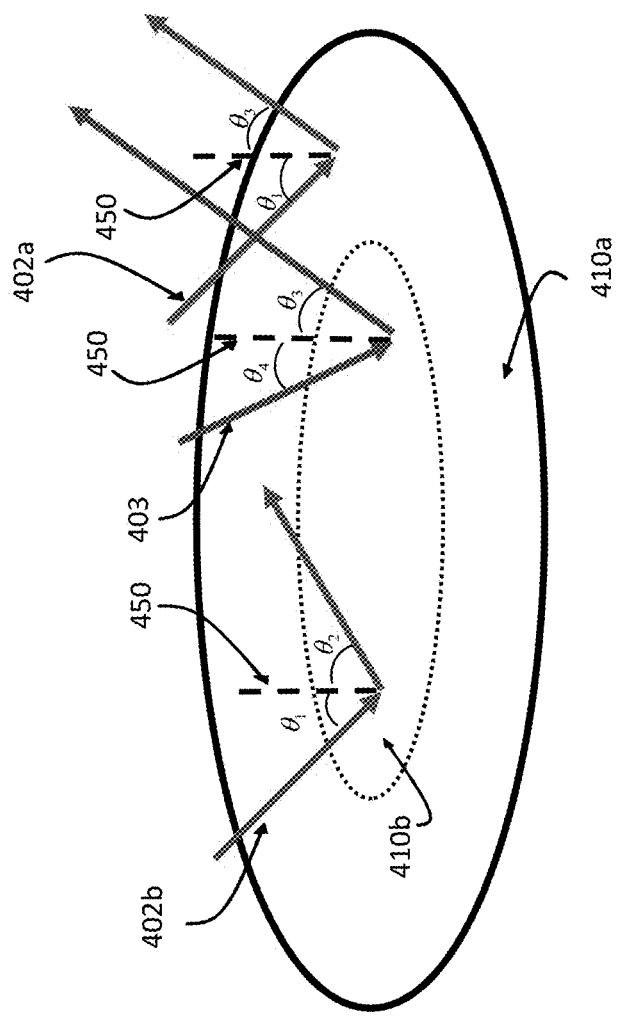
FIG. 4 illustrates the add/drop step of add/drop multiplexing.

One property of higher-order OAM modes is that they have a doughnut-like ring-shaped intensity distribution. Therefore, multiplexing of different OAM modes results in a group of concentric rings that are spatially collocated. It takes three steps to add/drop one channel (for example, an OAM mode with topological charge k). (1) Down-conversion: we first change the order of all OAM modes by −k, so that the selected data channel is transferred from the higher-order mode k to a Gaussian mode (k=0), whose energy is distributed in the beam center. All other channels are still an OAM modes with a ring-shaped intensity, although the mode order is changed by −k. As a result, the selected channel is spatially separated with the other channels. (2) The add/drop step is shown in FIG. 4. The down converted laser beams are reflected by a specially designed circular phase pattern that has an inner part and an outer part. The Gaussian mode and the higher-order OAM modes impinge on the inner part 410b and the outer part 410a of the optical grating respectively at an angle of incidence $\theta_1$ with respect to the normal 450. The inner part 410b reflect the Gaussian mode at an angle of reflection $\theta_2$ with respect to the normal 450, and the outer part 410a reflects the higher-order ring-shaped OAM modes at an angle of reflection $\theta_3$ with respect to the normal. The inner part 410b is designed such that the angle of reflection is greater than the angle of incidence ($\theta_2>\theta_1$). The outer part 410a is designed such that the angle of reflection is smaller than the angle of incidence ($\theta_3<\theta_1$) By controlling the difference between two grating areas of the phase pattern, the Gaussian mode 402b can be redirected apart from the higher-order modes 402a. Another Gaussian beam 403 carrying a new data stream impinges on the inner part of the optical grating at an incidence angle $\theta_4$ with respect to the normal 450 and is reflected at an angle of reflection $\theta_3$ with respect to the normal 450. Due to the design of the inner part 410b the angle of reflection is greater than the angle of incidence ($\theta_3>\theta_4$). Therefore, the second Gaussian beam 403 can be added to the higher-order OAM 402a by taking advantage of the two different gratings. (3) Up-conversion: we then change the order of the reflected modes (403 and 402a) by +k, i.e., every OAM mode is recovered, except that the data stream on OAM+k is updated. Consequently, the OAM mode add/drop function is achieved.

Figure 5A:
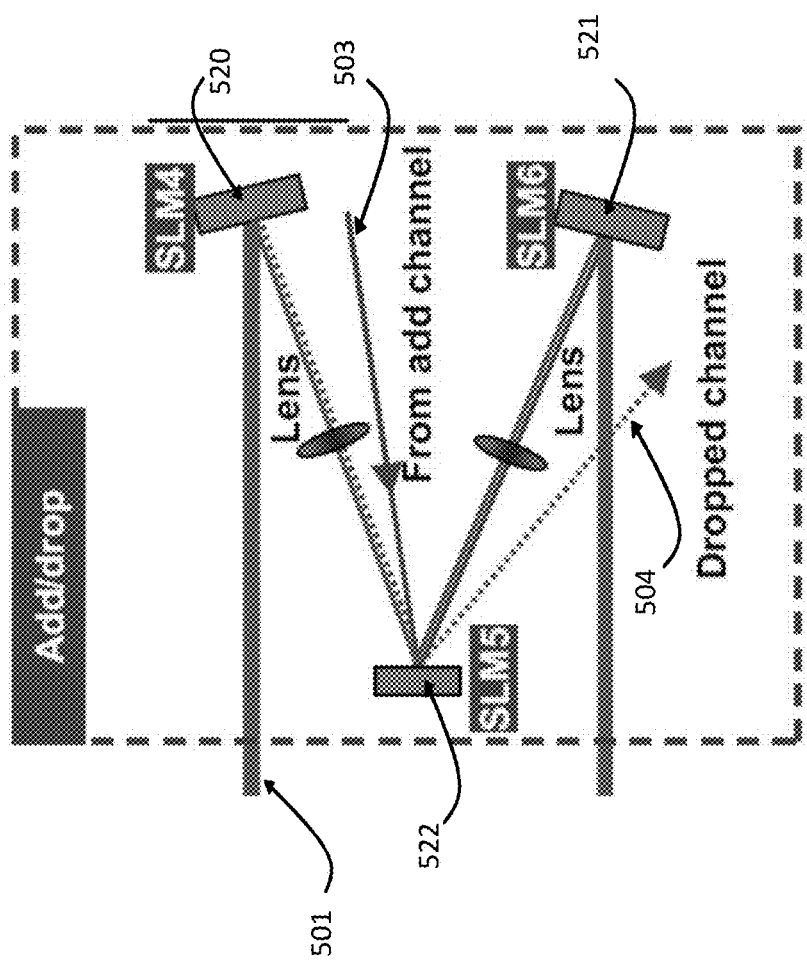
FIG. 5A illustrates an experimental set up of OAM mode add/drop multiplexing system.

FIG. 5A illustrates an experimental set up of OAM mode add/drop multiplexing system. Higher-order OAM modes with topological charge −5, +2 and +8 are multiplexed to obtain the input 501. The add/drop function block is achieved by using three SLMs. SLM4 520 with a spiral phase pattern of −k and SLM6 521 with a phase pattern of +k function as the down-converter and upconverter, respectively (k=−5, +2, +8 for adding/dropping OAM modes with topological charge −5, +2 and +8, respectively). SLM5 522 is loaded with a designed phase pattern including two grating areas: an inner part and an outer part. For the grating area in the center, the angle of reflection of an incident beam is greater than the angle of incidence of the incident beam, while for the grating in the outer part, the angle of reflection of an incident beam is less than the angle of incidence of the incidence beam. As a result, the dropped channel 504 is reflected in a different direction from the passthrough channels, and can be collected by a collimator for further detection. Another Gaussian beam 503 with the same beam waist to the down-converted Gaussian mode is launched onto the grating in the center part of SLM5 522, and is added to the passthrough modes after reflection by the grating. The grating parameters are optimized according to the size of the input beams.

Figure 5B:
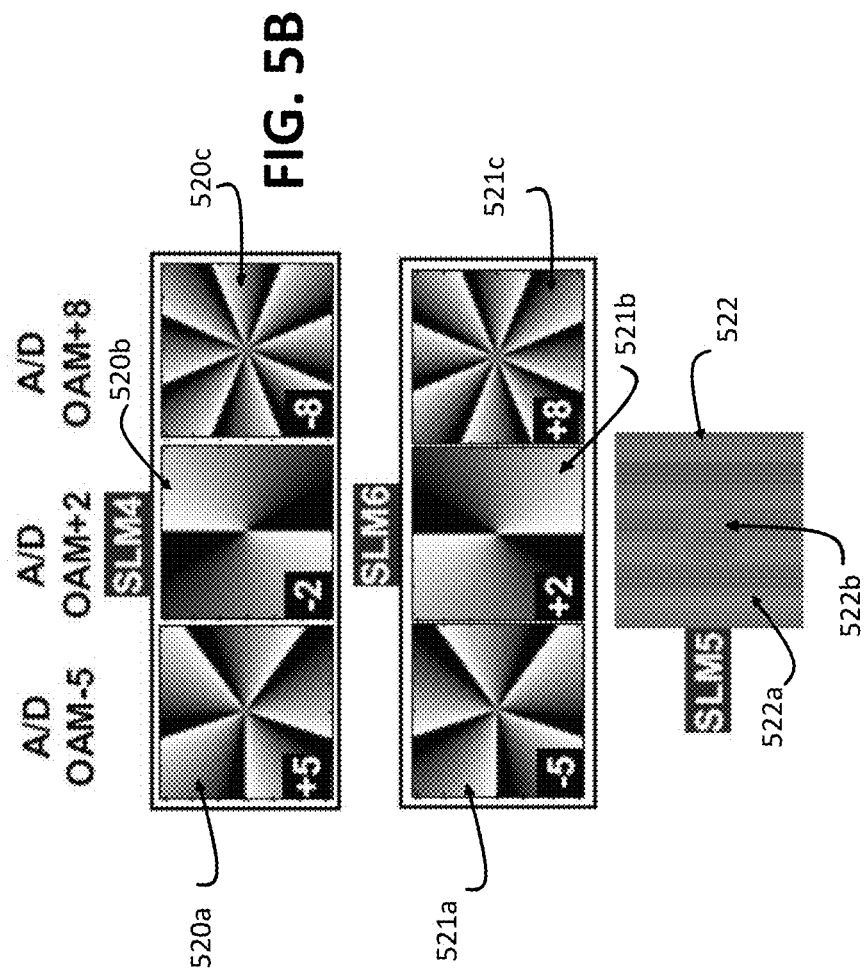
FIG. 5B illustrates the phase holograms of SLMs of FIG. 5A.

FIG. 5B shows the phase holograms on SLM4 520, SLM5 522 and SLM6 521 for add/drop operation of various modes. For example, to add/drop OAM mode with topological charge −5, SLM4 is loaded with a phase pattern 520a for down-conversion, and SLM6 is loaded with a spiral phase pattern of 521a for up-conversion. To add/drop OAM mode with topological charge +2, SLM4 is loaded with a phase pattern 520b for down-conversion, and SLM6 is loaded with a spiral phase pattern of 521b for up-conversion. In another example, to add/drop OAM mode with topological charge +8, SLM4 is loaded with a phase pattern 520c for down-conversion, and SLM6 is loaded with a spiral phase pattern of 521c for up-conversion. The phase pattern on SLM5 522 has of an outer part 522a and an inner part 522b. The phase pattern of SLM5 522 is the same for adding/dropping different OAM modes. The phrase "loaded" does not necessarily imply that SLM with one phase pattern is replaced by an SLM with a different desired phase pattern. It is possible to have an SLM that can be programmed, for instance by using a computer, to dynamically change the phase pattern and reflective properties of the SLM.

Figure 6:
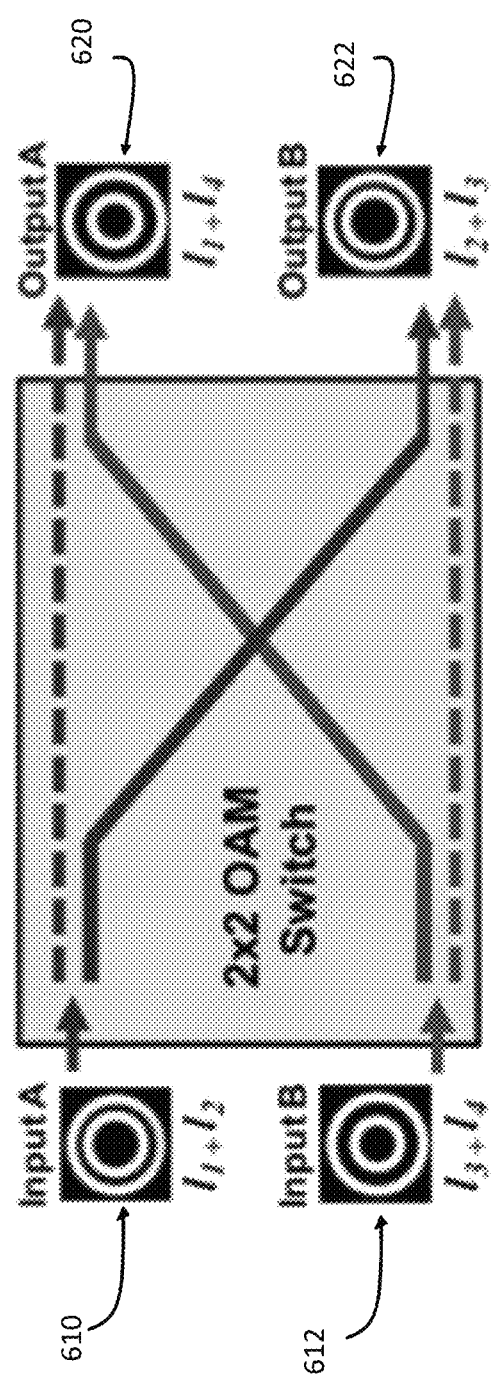
FIG. 6 illustrates a 2×2 OAM-based switch.

In FIG. 6, a 2×2 OAM-based switch is shown. A 2×2 OAM-based switch is analogous to a 2×2 WDM switch. In WDM networks, a 2×2 switch either redirects one of the input wavelength channels to appear at the opposite output port ('cross' state) or allows a wavelength channel to simply pass through the switch without being redirected ('bar' state). There are two input ports in the switch. The first input port receives Input A 610, and the second input port receives Input B 612. Both inputs 610 and 612 are obtained by multiplexing two higher-order OAM modes. There are two output ports, the first output port emits Output A 620 and the second output port emits Output B 622. Depending on the switch state, an OAM mode can be redirected to appear at a desired output port. The switch can be reconfigured to operate in either 'cross' or 'bar' state for each of the input OAM beams. As shown in FIG. 6, an exemplary switch configuration would be to switch topological charge $l_2$ with $l_4$, while $l_1$ and $l_3$ simply pass through the switch. If switching is not desired, then the switch could be configured in 'bar' state for all of the input OAM beams, in which case all of the input OAM beams simply pass through the switch without being redirected.

Figure 7:
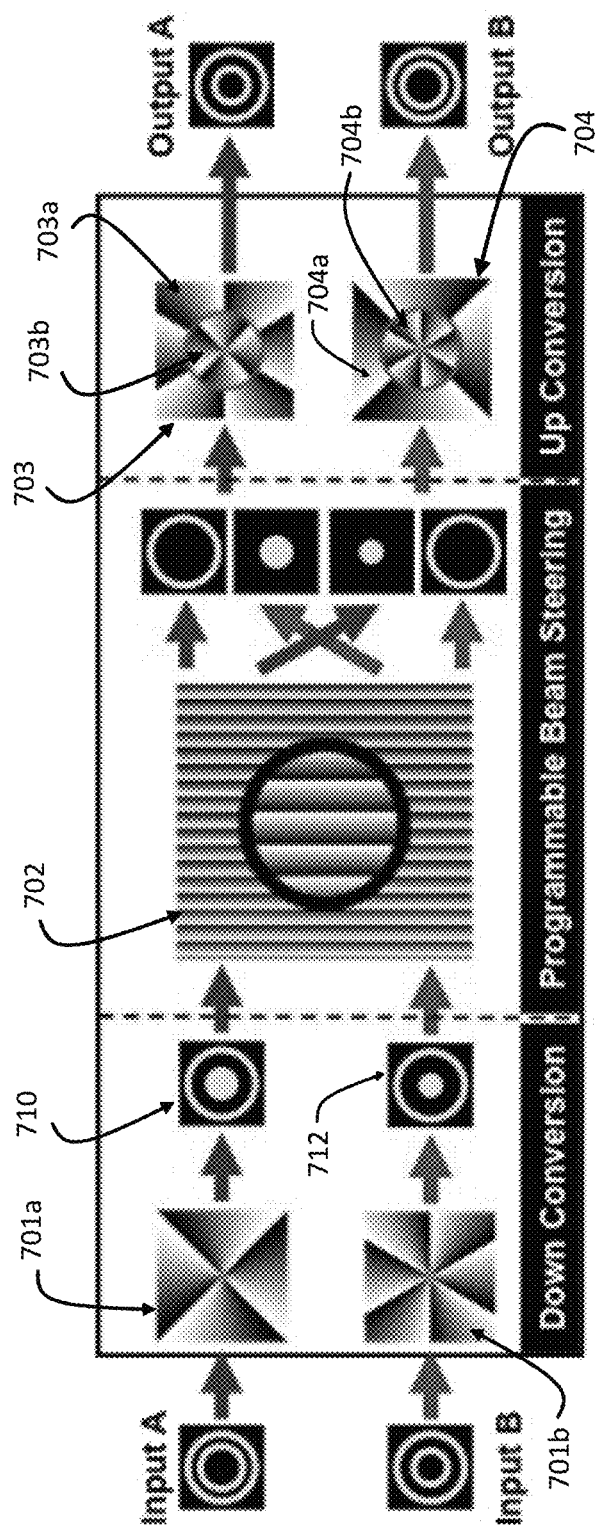
FIG. 7 illustrates a functional block diagram of a 2×2 OAM-based switch.

FIG. 7 depicts a functional block diagram of the 2×2 OAM-based switch. In each path, multiplexed OAM beams (Input A and Input B) go through a mode down-conversion stage. Mode down-conversion refers to transforming one of the incoming OAM beams (a donut-like transverse intensity profile with helical wave front) into a Gaussian-like beam with l=0 (a spot-like transverse intensity profile with planar wave front). Input A is down-converted by SLM 701a to beam 710 and Input B is down converted by SLM 701b to beam 712. The OAM modes in 710 and 712 are spatially separate after down-conversion. Once spatially separated, the beams are passed through SLM 702 (which in this case is a programmable mode-dependent beam-steering element). The SLM 702 spatially separates the Gaussian mode from the higher-order OAM mode by redirecting the inner Gaussian mode and outer higher-order OAM mode in different directions, such that the Gaussian mode from 710 aligns with the higher-order OAM mode from 712 and the Gaussian mode from 712 aligns with the higher-order OAM mode from 712. The mode orders of the newly aligned beams are corrected at the up-conversion stage by SLM 703 and SLM 704. SLMs 703 and 704 have outer parts 703a and 704a surrounding an inner parts 703b and 704b respectively. The Gaussian modes of 710 and 712 impinge on the inner parts 704b and 703b respectively and the higher-order modes of 710 and 712 impinge on the outer parts 703a and 704a respectively The outgoing OAM beams (Output A and Output B) have similar OAM values as their corresponding input beams (Input A and Input B). Up-conversion process is opposite of down-conversion process as it transforms an incoming Gaussian beam into an OAM beam with desired OAM value. After up-conversion stage, the beams are sent toward the corresponding output ports for further communication.

Figure 8:
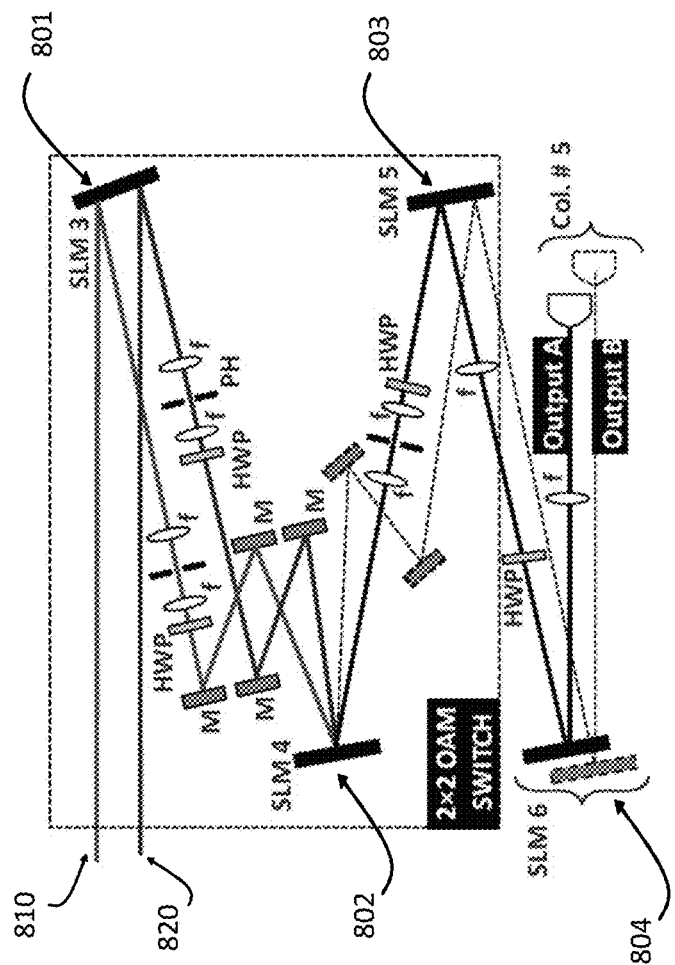
FIG. 8 illustrates an experimental set up of a 2×2 OAM-based switch.

FIG. 8 illustrates an experimental set up of a 2×2 OAM-based switch. The switch has two input ports to receive input beams 810 and 820. Each input beam includes two higher-order multiplexed OAM modes. SLM−3 801 is used inside the 2×2 switch to perform the down-conversion operation. For this purpose, we used an SLM with larger dimensions (600×792 pixels, 20 micron pixel pitch). The hologram on SLM−3 801 was also divided into two spatial regions (not shown), so that each region could down-convert one of the multiplexed OAM beams coming from each input port. After down-conversion, the beams were passed through an afocal system (f=200 mm) and were shone onto SLM−4 802. SLM−4 was used as a mode-dependent, variable beam-steering element and was programmed with a phase mask having two different blazed grating regions. The incoming beams from the two input ports were made to have different incidence angles at SLM−4 802. In conjunction with the steering angles of the blazed gratings, these incidence angles allowed redirection of the beams, such that the down-converted beam from one input port aligned and propagated collinearly with the OAM beam from the other input port.

Mode up-conversion was performed by SLM−5 803. Like SLM−3 it is divided into two parts, each serving one output port. Each part was programmed with a phase mask having two regions to properly up-convert the incident 'bar' and 'crossed' beams. In the experiments reported below, SLM−5 803 was implemented with an available SLM whose pixel count was not enough to simultaneously handle both output ports but only one at a time. SLM−5 803 formed the last stage of the 2×2 switch. Power levels at the input and output ports of the switch were 19 dBm and 8 dBm (for both the 'bar' and 'cross' states and for all four modes within ±0.5 dB), respectively, representing an insertion loss of 11 dB, whose main source was the SLMs' diffraction efficiencies. At the receive end, SLM−6 804 was used to select only one of the incoming OAM beams and transform it into a Gaussian-like beam with l=0 which can be coupled into a single-mode fiber (SMF) by using a collimator.

Figure 9:
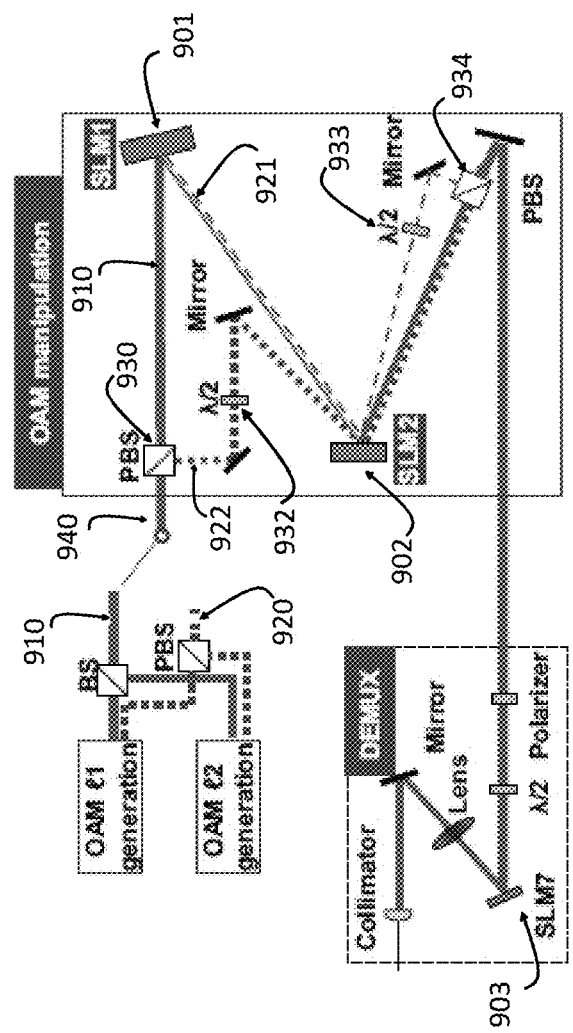
FIG. 9 illustrates a reconfigurable system for OAM and polarization manipulation of OAM channels.

FIG. 9 shows a reconfigurable system for OAM and polarization manipulation of OAM-muxed 100-Gbit/s Quadrature phase shift keying (QPSK) data channels. Given two input data channels, the reconfigurable system can arbitrarily change each data channel's OAM value, as well as its polarization state by using liquid crystal on silicon based spatial light modulators (SLM) and by taking advantage of the unique wavefront profile of OAM beams. The manipulation operation introduces a power penalty of <1 dB for 100-Gbit/s QPSK signals. Each of the pol-muxed and OAM-muxed data channels can be optically switched to a different polarization and/or a different OAM charge without affecting the carried data. 100 Gbit/s QPSK signal is prepared and split into two copies, each of which is converted to an OAM beam by "OAM l1 generation" and "OAM l2 generation" system in FIG. 9. OAM-muxed signal 910 and polarization multiplexed signal, 920 can be received by the input port 940. Manipulation of polarization and OAM mode of 910 and 920 is achieved by using two SLMs. For OAM-muxed input signal 910, SLM1 901 loaded with a spiral phase pattern with a charge of −l1 can convert (a) the OAM mode with topological charge l1 down to a Gaussian beam, and (b) the OAM mode with topological charge l2 to an OAM mode with topological charge l2−l1. The two resulting beams have different spatial distribution. The Gaussian beam has a Gaussian intensity profile, while the higher-order OAM beam has a ring-like intensity distribution. The surface of the SLM2 902 is split into two different regions. The first region only covers and redirects the down-converted Gaussian beam. This first region also converts the Gaussian beam into a higher-order OAM beam. The second region of SLM2 902 covers and redirects the higher-order OAM beam, and also shifts the OAM charge of the higher-order OAM beam to a different value. The beam redirected from the first region of SLM2 and the beam redirected from the second region of SLM2 can be combined by a Polarization Beam Splitter (PBS) 934.

For pol-muxed input beam 920, a PBS 930 splits the two polarizations. The first polarization 921 impinges on SLM1 901 while the second polarization 922, after going through a half wave plate 932, impinges on SLM2 902. The first and the second polarization can now be independently OAM-shifted by 901 and 902 separately, and then spatially multiplexed by controlling the diffraction angle of the two different regions on SLM2 902. To achieve spatial multiplexing, the OAM beam with first polarization 921 is reflected by SLM2 so that it passes through a half-wave plate 933 and is then directed towards a Polarization Beam Splitter (PBS) 934. The PBS recombines the OAM beam with the first polarization 921 with the OAM beam with the second polarization 922 (that is reflected by SLM2 902). The combined beam is then directed towards a DEMUX system that includes a spatial light modulator SLM7 903.

Next, OAM-based reconfigurable optical switching functions with multiple OAM modes as inputs is shown. For example, multi-pair data channel exchange and selective manipulation of OAM modes can be achieved. Multi-pair OAM modes can exchange their information with respect to the symmetric axis of their OAM charge number. Selective OAM manipulation can be realized by spatially separating the OAM modes and implementing desired patterns at different regions of the SLM. As an example, selective data exchange among OAM channels with topological charge −5, +2 and +8, can be demonstrated.

Figure 10:
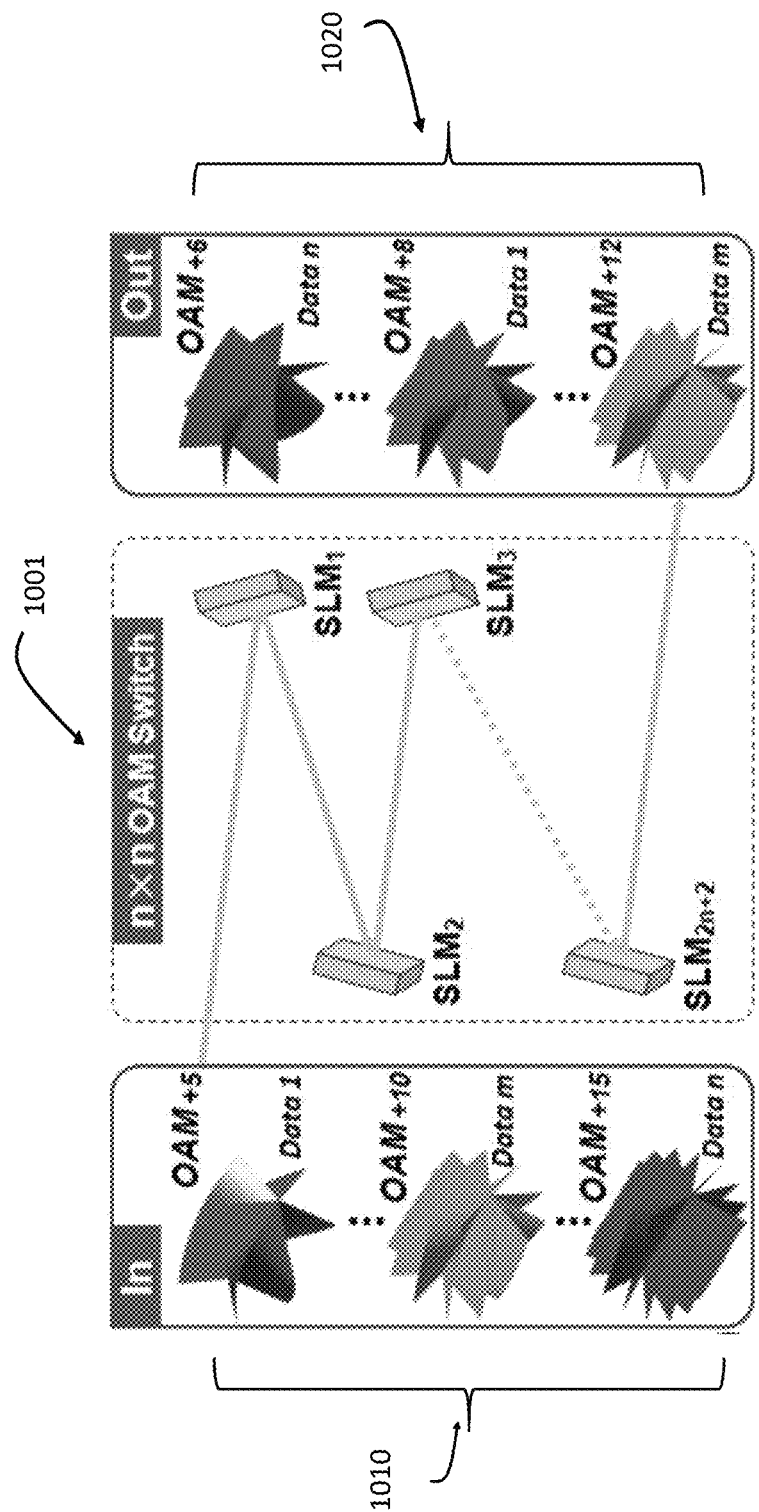
FIG. 10 illustrates a schematic diagram of n×n OAM switch.
Figure 11:
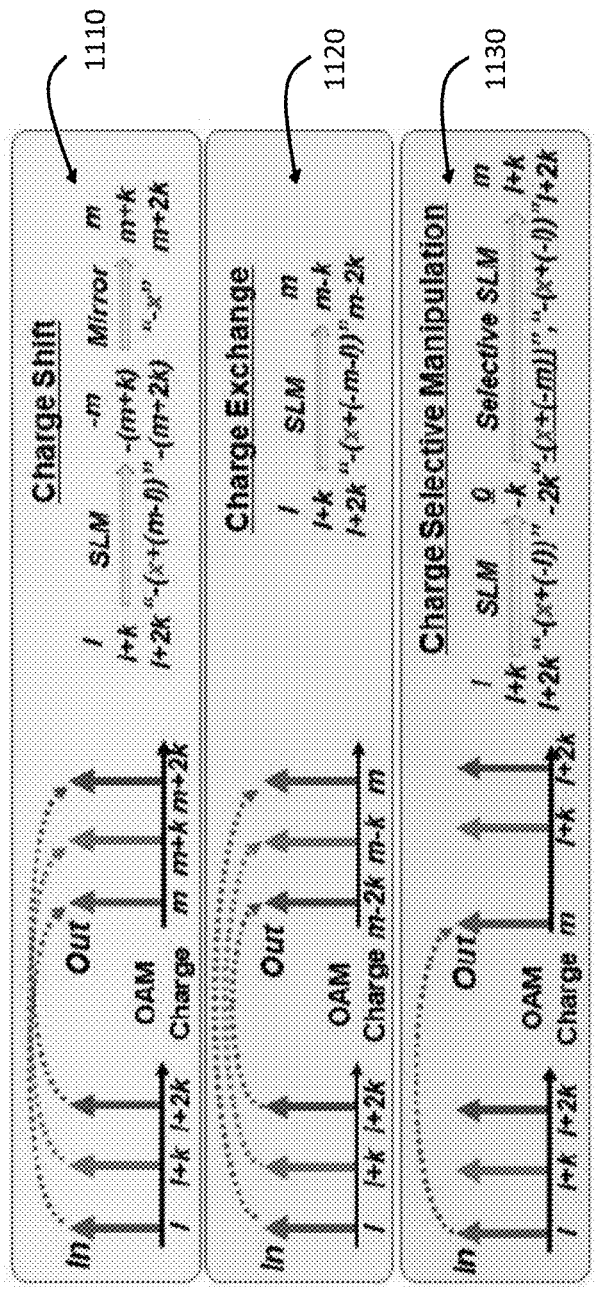
FIG. 11 illustrates an OAM-based reconfigurable optical networking functions.

FIG. 10 is the schematic diagram of n×n OAM switch 1001, which shows an architecture to switch n input modes 1010 with arbitrary OAM charges to n OAM modes 1020 with desired charges. By using the OAM-based reconfigurable optical networking functions as shown in FIG. 11, this building block can be realized with 2n+2 SLMs. "Charge shift," 1110 which shifts all the OAM mode by the same charge step m−l, can be realized by using a SLM with topological charge m−l and a mirror. "Charge exchange." 1120 which reverses the order of the OAM modes, can be realized by using one SLM. Exchanging information of two OAM modes can potentially be extended to exchange information among symmetrically distributed multi-pair OAM modes on the OAM spectrum "Charge shift" and "charge exchange" operate on all the OAM modes simultaneously. To realize a fully functional OAM-based reconfigurable optical network, more advanced functions to manipulate individual OAM modes are in great demand. A charge selective manipulation 1130 function can be implemented to meet this goal. In some implementations, the charge of one OAM mode can be manipulated without affecting the other modes' by simply using 2 SLMs. By effectively cascading the above function, we can relocate any input n OAM modes to any desired output state with a maximum of 2n+2 SLMs.

Figure 12:
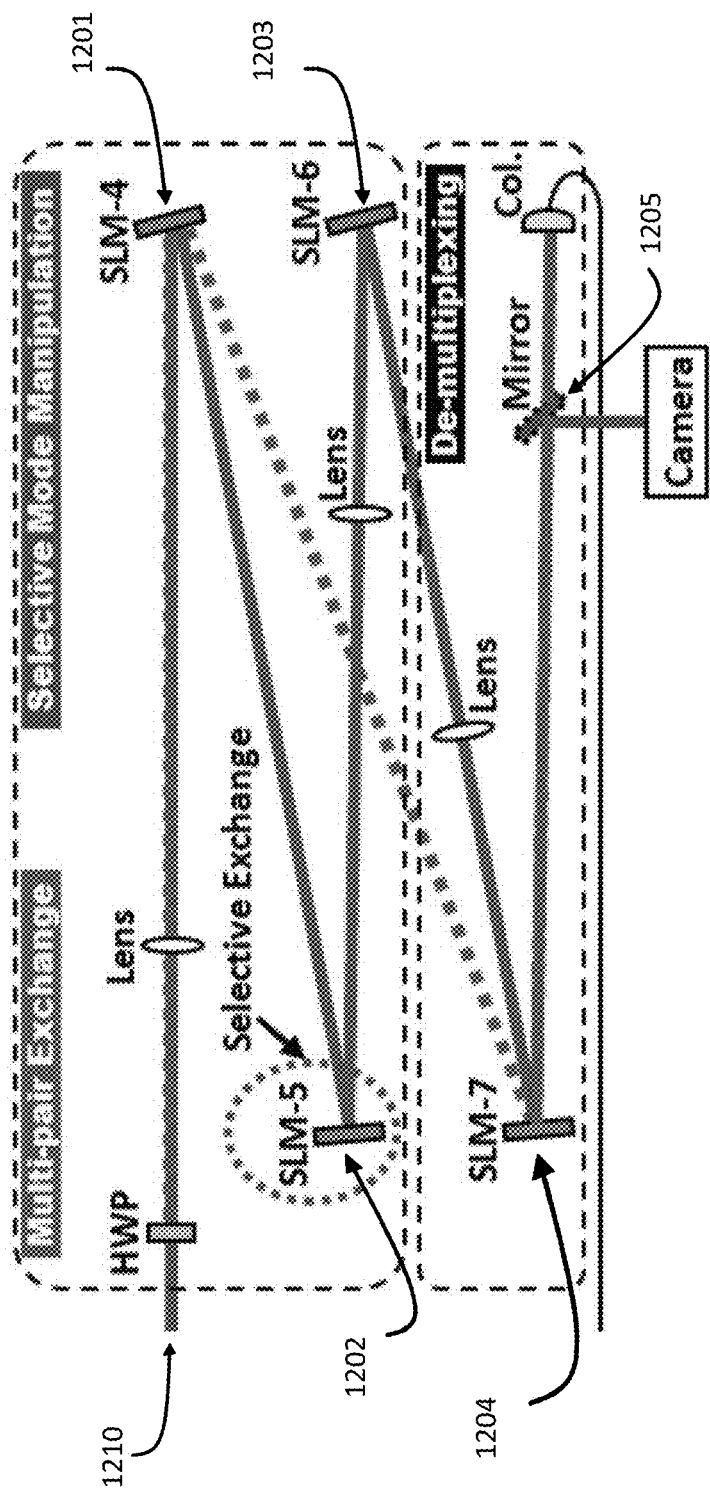
FIG. 12 illustrates an experimental setup for reconfigurable switching among channels carried by OAM modes.

FIG. 12 shows an experimental setup for reconfigurable switching among channels carried by OAM modes. A 100-Gbit/s QPSK signal, can be generated from a continuous-wave (CW) laser, and then modulated by an I/Q modulator at 2×50 Gbit/s. The signal is then split into three paths, decorrelated, and delivered over three OAM modes, which can be converted from the collimated Gaussian beams by SLMs loaded with different phase patterns. For multi-pair exchange experiment, together with another three SLMs, 6 SLMs at the multiplexing stage are used. The polarization states of the Gaussian beams are optimized with half-wave plates (HWPs) before the SLMs. Three 100-Gbit/s QPSK-carrying OAM modes are multiplexed using three non-polarizing beam splitters (BS) and constitute the input beam 1210

For multi-pair exchange, only SLM-4 1201 is used. For the selective OAM mode manipulation, three SLMs (SLM-4 1201, SLM-5 1202 and SLM-6 1203) are used to perform the functions of baseband conversion, selective manipulation and back conversion, respectively. Another SLM (SLM-7 1204) loaded with a specified phase pattern is used to demultiplex one of the superposed OAM modes back to the Gaussian beam and coupled into the fiber for coherent detection. A flip mirror 1205 is used to reflect the OAM beams into the camera for monitoring the intensity and phase information.

Figure 13:
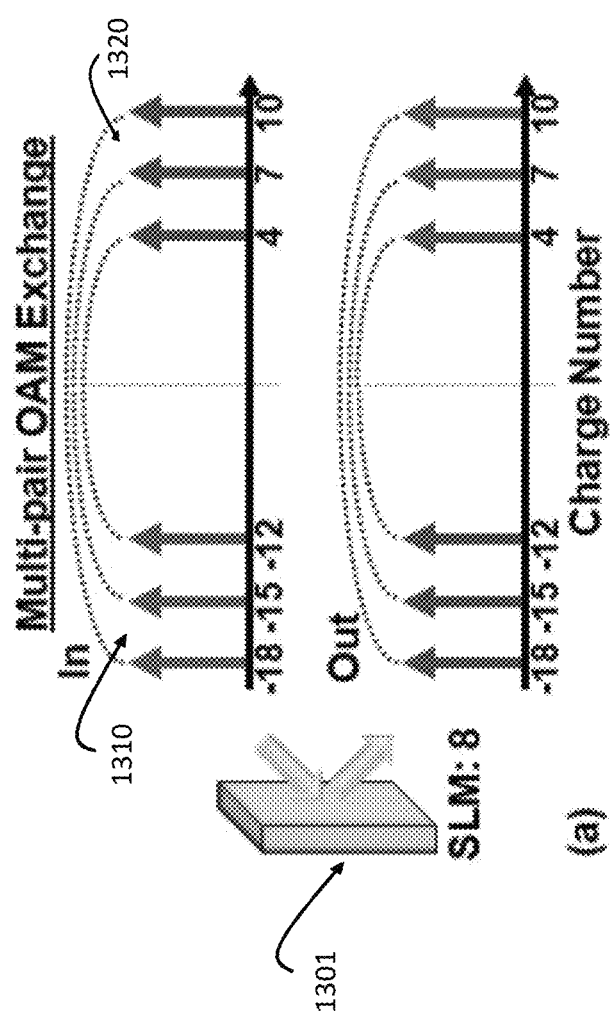
FIG. 13 illustrates the concept of exchanging multi-pair OAM modes.

The concept of exchanging multi-pair OAM modes is shown in FIG. 13. We are exchanging OAM modes between topological charges "−18, −15, −12" 1310 and "4, 7, 10" 1320. Only one SLM 1301 with topological charge 8 is used to realize this function. As an example, OAM mode with charge −15 adds 8 from the topological charge of the SLM 1301 and then flips the sign after the reflection. This gives the original OAM−15 a final charge of 7.

Figure 14:
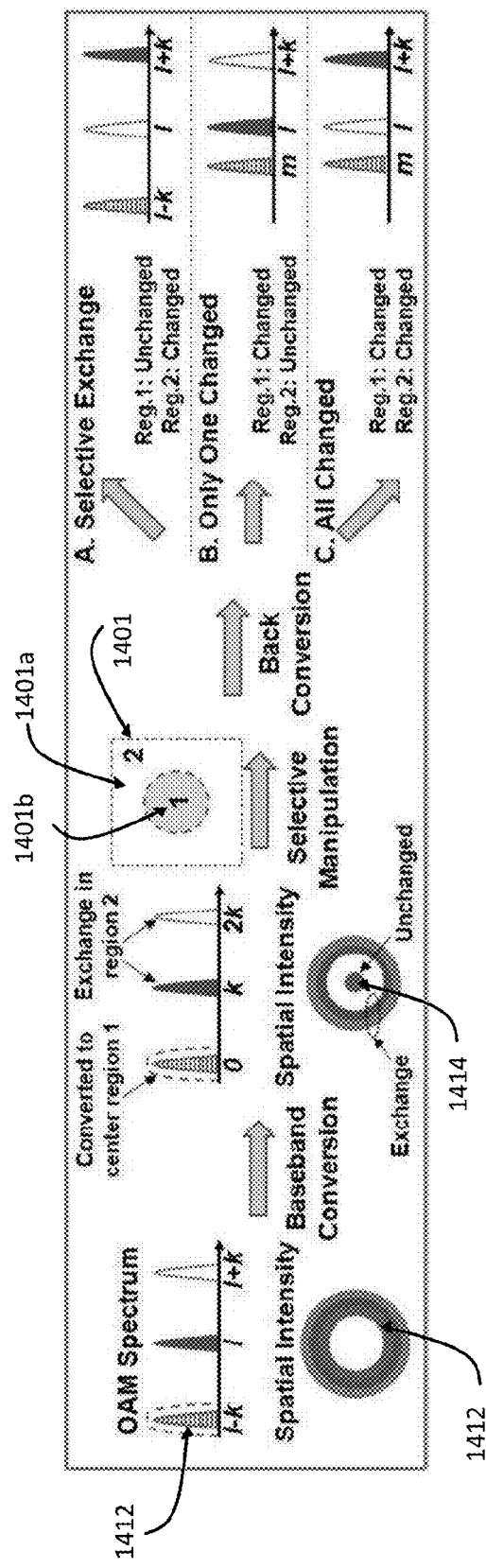
FIG. 14 illustrates the concept and principle of selective manipulation among OAM modes.

FIG. 14 depicts the concept and principle of selective manipulation among OAM modes. One OAM mode 1412 is firstly converted down to the center as a Gaussian beam 1414, while the other modes maintain the ring-shape intensity profile. The SLM 1401 is spatially separated into a center circular region 1 1401b and outer region 2 1401a. By implementing desired patterns to different regions of the SLM, selectively manipulation of the OAM modes can be realized. A back conversion is used to convert the OAM modes, that we do not want to change, to their original states. Selective data exchange among signals carried by different OAM modes is an example of this function. The data carried on any two of the OAM channels can be exchanged while not affecting the other channel.

The reconfigurable switching shown in FIG. 12 can also be used for selective data exchange. Let us assume, that the input 1210 includes three higher-order OAM beams with topological charge −5, +2 and +8 (referred to as OAM−5, OAM+2 and OAM+8 respectively) that are spatially overlapped. As an example, we are planning to exchange the information on OAM−5 and OAM+8, while not affecting OAM+2. The OAM+2 mode is firstly converted to a Gaussian beam by launching the multiple OAM modes into SLM-4 1201 with a topological charge of −2, while OAM−5 and OAM+8 are converted OAM+7 and OAM−6. SLM-5 1202 is spatially separated into two regions. The center region has uniform phase, while the outer region has a topological charge of −1. After reflecting from SLM-5, original OAM−5 and OAM+8 are flipped to OAM−6 and OAM+7, while the original OAM+2 maintains the Gaussian profile. After the up conversion from SLM-6 1203 with topological charge of −2, original OAM−5, OAM+2 and OAM+8 are converted to OAM+8, OAM+2 and OAM−5, and thus the information on OAM−5 and OAM+8 are selectively exchanged.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other implementations fall within the scope of the following claims.

What is claimed is:

1. A device for Orbital Angular Momentum (OAM) based optical communications comprising:
a first spatial light modulator configured to down-convert a first plurality of higher-order OAM modes from a communication signal to a second plurality of higher-order OAM modes and a first Gaussian mode;
a second spatial light modulator configured to drop the first Gaussian mode and add a second Gaussian mode to the second plurality of higher-order OAM modes, wherein the first Gaussian mode is different from the second Gaussian mode; and
a third spatial light modulator configured to up-convert the second plurality of higher-order OAM modes and the second Gaussian mode to a third plurality of higher-order OAM modes for further communications, wherein the third spatial light modulator comprises two parts, an inner part configured to up-convert the second Gaussian mode, and an outer part, surrounding the inner part, configured to up-convert the second plurality of OAM modes.

2. A device for Orbital Angular Momentum (OAM) based optical communications comprising:
a first spatial light modulator configured to down-convert a first plurality of higher-order OAM modes from a communication signal to a second plurality of higher-order OAM modes and a first Gaussian mode;
a second spatial light modulator configured to drop the first Gaussian mode and add a second Gaussian mode to the second plurality of higher-order OAM modes, wherein the first Gaussian mode is different from the second Gaussian mode, wherein the second spatial light modulator comprises an inner part, and an outer part, surrounding the inner part, the inner part reflects the first Gaussian mode, and the outer part reflects the modes of the second plurality of OAM modes other than the first Gaussian mode; and
a third spatial light modulator configured to up-convert the second plurality of higher-order OAM modes and the second Gaussian mode to a third plurality of higher-order OAM modes for further communications.

3. The device of claim 1, comprising a fourth spatial light modulator configured to down-convert a fourth plurality of higher-order OAM modes from a communication signal to a fifth plurality of higher-order OAM modes and a third Gaussian mode.

4. The device of claim 3, wherein the third Gaussian mode is the second Gaussian mode.

5. The device of claim 3, wherein the second spatial light modulator is configured to drop the third Gaussian mode, and add the first Gaussian mode to the fifth plurality of higher-order OAM modes.

6. The device of claim 5, comprising a fifth spatial light modulator configured to up-convert the fifth plurality of higher-order OAM modes and the first Gaussian mode to a sixth plurality of higher-order OAM modes for further communication.

7. The device of claim 6, wherein the fifth spatial light modulator comprises two parts, an inner part configured to up-convert the first Gaussian mode, and an outer part, surrounding the inner part, configured to up-convert the fifth plurality of higher-order OAM modes.

8. The device of claim 7, wherein the inner part of the fifth spatial light modulator is configured such that the angle of reflection of the first Gaussian mode is greater than the angle of incidence of the first Gaussian mode.

9. The device of claim 8, wherein the outer part of the fifth spatial light modulator is configured such that the angle of reflection of the second plurality of higher-order OAM modes is less than the angle of incidence of the second plurality of higher-order OAM modes.

10. The device of claim 1, wherein the second spatial light modulator comprises an inner part, and an outer part, surrounding the inner part, the inner part reflects the first Gaussian mode, and the outer part reflects the modes of the second plurality of OAM modes other than the first Gaussian mode.

11. The device of claim 2, wherein the third spatial light modulator comprises two parts, an inner part configured to up-convert the second Gaussian mode, and an outer part, surrounding the inner part, configured to up-convert the second plurality of OAM modes.

12. A device for Orbital Angular Momentum (OAM) based optical communications comprising:
- a down-converter configured to down-convert a first plurality of higher-order OAM modes from a communication signal to a second plurality of higher-order OAM modes and a first Gaussian mode;
- a spatial light modulator configured to drop the first Gaussian mode and add a second Gaussian mode to the second plurality of higher-order OAM modes, wherein the first Gaussian mode is different from the second Gaussian mode; and
- an upconverter comprising
    - an inner part configured to up-convert the second Gaussian mode, and
    - an outer part, surrounding the inner part, configured to up-convert the second plurality of OAM modes,
    - wherein the up-converted second Gaussian mode and the up-converted second plurality of OAM modes represent a third plurality of higher-order OAM modes for further communications.

13. The device of claim 12, wherein the spatial light modulator comprises an inner part, and an outer part, surrounding the inner part, the inner part reflects the first Gaussian mode, and the outer part reflects the modes of the second plurality of OAM modes other than the first Gaussian mode.

* * * * *